United States Patent
Zhang et al.

(10) Patent No.: US 9,971,014 B2
(45) Date of Patent: May 15, 2018

(54) ACCESS POINT-ASSISTED POSITIONING FRAMEWORK

(71) Applicant: QUALCOMM Incorporated, San Diego, CA (US)

(72) Inventors: Xiaoxin Zhang, Fremont, CA (US); Sandip Homchaudhuri, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 14/267,717

(22) Filed: May 1, 2014

(65) Prior Publication Data

US 2014/0334401 A1    Nov. 13, 2014

Related U.S. Application Data

(60) Provisional application No. 61/822,851, filed on May 13, 2013.

(51) Int. Cl.
    *H04W 64/00*  (2009.01)
    *G01S 5/02*   (2010.01)
    *H04W 56/00*  (2009.01)

(52) U.S. Cl.
    CPC .......... *G01S 5/0236* (2013.01); *G01S 5/0226* (2013.01); *H04W 56/002* (2013.01); *H04W 64/00* (2013.01)

(58) Field of Classification Search
    None
    See application file for complete search history.

(56) References Cited

U.S. PATENT DOCUMENTS

| 8,699,409 B2 | 4/2014 | Aryan et al. |
| 2003/0053480 A1* | 3/2003 | Jang ................ H04L 12/413 370/445 |

(Continued)

FOREIGN PATENT DOCUMENTS

| CN | 101228807 A | 7/2008 |
| CN | 101305567 A | 11/2008 |

(Continued)

OTHER PUBLICATIONS

ISA/EPO, International Search Report and Written Opinion of the International Searching Authority, Int'l. App. No. PCT/US2014/036486, dated Sep. 8, 2014, European Patent Office, Rijswijk, NL 9 pgs.

*Primary Examiner* — Hassan Phillips
*Assistant Examiner* — Ayanah George
(74) *Attorney, Agent, or Firm* — Holland & Hart LLP

(57) ABSTRACT

Methods, systems, and devices are described for a wireless positioning framework in which an access point (AP) broadcasts a message within a beacon interval that identifies a transmission schedule for a set of stations. The message may include an information element identifying the stations in the set. The set may be determined based on station clock drifts and/or a ranging accuracy sought by the AP. The AP may also provide a station identifier, and frame spacing and delay parameters, which may be used to determine a distinct backoff for each station. Using distinct backoffs allow the stations to avoid collisions when sending the transmissions. The AP may receive the transmissions according to the identified schedule and may determine a range (e.g., round-trip time) for each station in the set based at least on a time at which the respective transmission is received.

30 Claims, 21 Drawing Sheets

(56) References Cited

U.S. PATENT DOCUMENTS

| | | | | |
|---|---|---|---|---|
| 2003/0198179 | A1* | 10/2003 | Koo | H04J 3/0682 |
| | | | | 370/208 |
| 2007/0293237 | A1* | 12/2007 | Correal | H04W 4/02 |
| | | | | 455/456.1 |
| 2007/0298761 | A1* | 12/2007 | Bani Hani | G01S 5/145 |
| | | | | 455/404.2 |
| 2008/0095092 | A1* | 4/2008 | Kim | H04W 52/287 |
| | | | | 370/311 |
| 2010/0265842 | A1* | 10/2010 | Khandekar | H04W 72/0433 |
| | | | | 370/252 |
| 2011/0255528 | A1* | 10/2011 | Zakrzewski | H04W 56/009 |
| | | | | 370/350 |
| 2012/0063340 | A1* | 3/2012 | Waters | G01S 5/0242 |
| | | | | 370/252 |
| 2013/0286909 | A1* | 10/2013 | Panneerselvam | H04W 52/0206 |
| | | | | 370/311 |
| 2013/0336234 | A1* | 12/2013 | Ghosh | H04W 72/10 |
| | | | | 370/329 |

FOREIGN PATENT DOCUMENTS

| | | | |
|---|---|---|---|
| WO | WO 2007013850 A2 * | 2/2007 | .......... G01S 5/0226 |
| WO | WO-2007013850 A2 | 2/2007 | |
| WO | WO-2007013859 A1 | 2/2007 | |
| WO | WO-2007031844 A2 | 3/2007 | |
| WO | WO-2010118104 A1 | 10/2010 | |

* cited by examiner

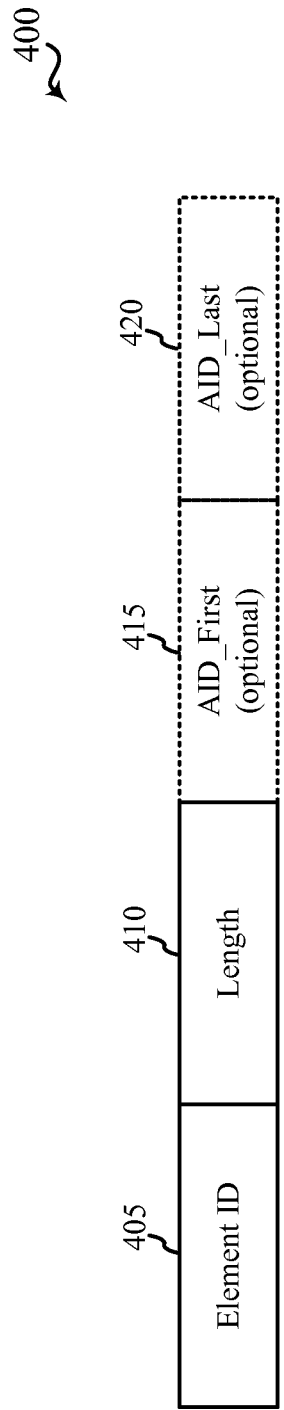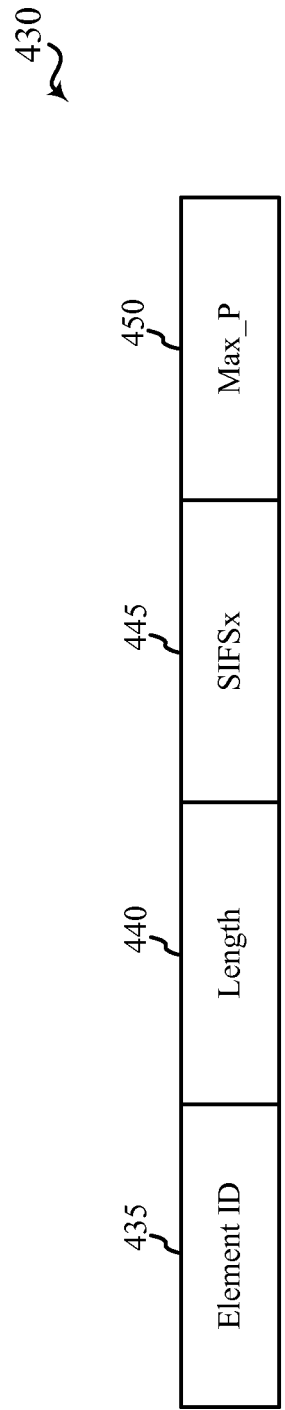
FIG. 4A
FIG. 4B

ACCESS POINT-ASSISTED POSITIONING FRAMEWORK

CROSS REFERENCES

The present Application for Patent claims priority to U.S. Provisional Patent Application No. 61/822,851 by Zhang et al., entitled "Access Point-Assisted Positioning Framework," filed May 13, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network devices such as access points (APs) that can support communication for a number of wireless devices. A wireless device may communicate with a network device bidirectionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP.

In WLANs, there may be cases in which knowing the positioning (e.g., distance, delay) between two devices, such as between an AP and an associated station, may be useful. Existing wireless positioning techniques, however, tend to impact the throughput of the AP-station link because of the large number of frames that are typically exchanged to make measurements. Moreover, these techniques introduce significant measurement latencies and may impact the overall system throughput when an AP serves multiple stations for positioning. Therefore, wireless positioning techniques that are simpler to implement, have low latency, and have reduced bandwidth impact are desirable.

SUMMARY

Various methods, systems, devices, and apparatuses are described for a wireless positioning framework in which an access point (AP) broadcasts a message within a beacon interval that identifies a transmission schedule for a set of stations. The message may include an information element (IE) identifying the stations in the set. The set may be determined based on station clock drifts and/or a ranging accuracy sought by the AP. The AP may also provide a station identifier (e.g., association identification or AID), and frame spacing and delay parameters, which may be used to determine a distinct backoff for each station. Using distinct backoffs allow the stations to avoid collisions when sending the transmissions. The AP may receive the transmissions according to the identified schedule and may determine a range (e.g., round-trip time or RTT) for each station in the set based at least on a time at which the respective transmission is received.

In some embodiments, a method for wireless positioning includes broadcasting a message that identifies a schedule of transmissions for a set of stations, receiving a transmission from a plurality of the stations transmitted according to the identified schedule, and determining a range for at least one of the stations based at least on a time at which the respective transmission is received.

In some embodiments, an apparatus for wireless positioning includes a transmitter configured to broadcast a message that identifies a schedule of transmissions for a set of stations, a receiver configured to receive a transmission from a plurality of the stations transmitted according to the identified schedule, and a determinator configured to determine a range for at least one of the stations based at least on a time at which the respective transmission is received.

In some embodiments, a device for wireless positioning includes a processor, memory in electronic communication with the processor, and instructions embodied in the memory. The instructions may be executable by the processor to broadcast a message that identifies a schedule of transmissions for a set of stations, receive a transmission from a plurality of the stations transmitted according to the identified schedule, and determine a range for at least one of the stations based at least on a time at which the respective transmission is received.

In some embodiments, a computer program product for wireless positioning includes a non-transitory computer-readable medium storing instructions executable by a processor to broadcast a message that identifies a schedule of transmissions for a set of stations, receive a transmission from a plurality of the stations transmitted according to the identified schedule, and determine a range for at least one of the stations based at least on a time at which the respective transmission is received.

Various embodiments of the method, apparatus, device, and/or computer program product may include the features of, modules for, and/or processor-executable instructions for identifying a frame spacing parameter and a delay parameter to be used for determining the schedule. The schedule may identify a distinct backoff for the transmission from the plurality of the stations. In some cases, the distinct backoff for the plurality of the stations is based at least on a respective station identifier. The schedule of transmissions for the set of stations may include a schedule of uplink transmissions for the set of stations. In some examples, the transmissions from the plurality of the stations include an uplink transmission from at least one of the stations. Additionally or alternatively, the schedule of transmissions for the set of stations may include a schedule of downlink transmissions for the set of stations. In some examples, the transmissions from the plurality of the stations include a downlink transmission from at least one of the stations.

Various embodiments of the method, apparatus, device, and/or computer program product may include the features of, modules for, and/or processor-executable instructions for adapting one or both of the frame spacing parameter and the delay parameter based at least on the at least one range determined for the stations. In some cases, identifying the frame spacing parameter may include exchanging packets with a plurality of the stations to determine a plurality of frame spacing parameters for the stations, and identifying a largest of the plurality of frame spacing parameters to be used for determining the schedule.

Various embodiments of the method, apparatus, device, and/or computer program product may include the features of, modules for, and/or processor-executable instructions for identifying the stations in the set from a plurality of stations associated with an access point. The stations in the set may be identified based at least on a ranging accuracy sought by an access point.

Various embodiments of the method, apparatus, device, and/or computer program product may include the features of, modules for, and/or processor-executable instructions for estimating clock drifts for the plurality of stations, wherein the stations in the set are identified based at least on the estimated clock drifts.

Various embodiments of the method, apparatus, device, and/or computer program product may include the features of, modules for, and/or processor-executable instructions for assigning a station identifier to at least one of the stations in the set to define an order of transmissions in the schedule.

Various embodiments of the method, apparatus, device, and/or computer program product may include the features of, modules for, and/or processor-executable instructions for defining an order of transmissions in the schedule according to a clock drift or a ranging accuracy sought for at least one respective station.

Various embodiments of the method, apparatus, device, and/or computer program product may include the features of, modules for, and/or processor-executable instructions for determining a duration of the scheduled transmissions, and directing at least one station outside the set to avoid transmissions during the duration of the scheduled transmissions. In some examples, the broadcast message may identify at least one of the stations in the set.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition or limit of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A shows a diagram that illustrates an example of a synchronized coordinate compute (SCC) IE for AP-assisted wireless positioning according to various embodiments;

FIG. 4B shows a diagram that illustrates an example of an SCC parameters IE for AP-assisted wireless positioning according to various embodiments;

DETAILED DESCRIPTION

Described embodiments are directed to methods, systems, devices, and apparatuses for an AP-assisted wireless positioning framework in which an AP broadcasts a message within a beacon interval that identifies a transmission schedule for a set of stations, such as an uplink transmission schedule or a downlink transmission schedule. The message may include an information element or IE that identifies the stations in the set. For example, the IE may include at least one field that indicates which of the stations associated with the AP are to send transmissions for ranging or positioning measurements. The set of stations may be determined based on station clock drifts and/or a ranging accuracy sought by the AP. The AP may also provide each station with a station identifier (e.g., AID), and with frame spacing and delay parameters, which may be used to determine a distinct backoff or backoff time for each station. The frame spacing and delay parameters may be provided by the AP through a separate IE, for example. By using distinct backoffs the stations may avoid collisions when sending the transmissions. The AP may receive the transmissions according to the identified schedule and may determine a range (e.g., RTT) for each station in the set based at least on a time at which the respective transmission is received. The AP may then broadcast the RTTs out in a next beacon frame. In some cases, the AP may be configured to make angle of arrival (AoA) measurements. In those cases, the AP may combine the RTT and AoA measurements and may broadcast the combined measurements in a next beacon frame.

The AP-assisted wireless positioning techniques presented herein are generally described in connection with WLANs for simplicity. A WLAN (or Wi-Fi network) may refer to a network that is based on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
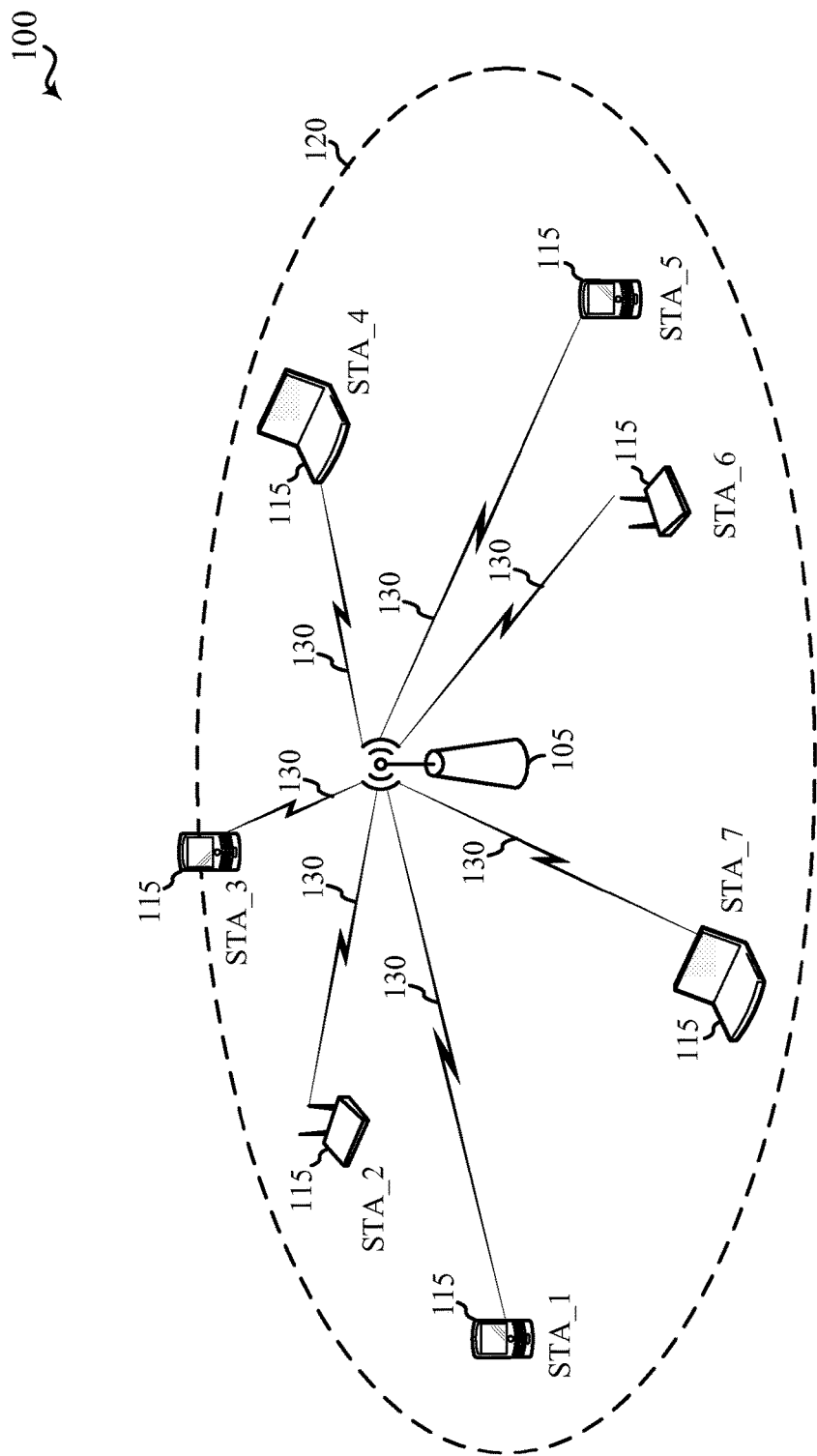
FIG. 1A shows a diagram that illustrates an example of a wireless local area network (WLAN) that supports AP-assisted wireless positioning according to various embodiments.

Referring first to FIG. 1A, a WLAN or Wi-Fi network 100 is shown that is configured to provide AP-assisted positioning. The WLAN 100 includes an AP 105 and multiple associated stations 115. In this example, there are shown seven (7) stations or STAs 115, which are identified as STA_1, STA_2, STA_3, STA_4, STA_5, STA_6, and STA_7. The WLAN 100, however, may have more or fewer stations 115 than those shown in FIG. 1A since the number shown is simply for illustrative purposes. The AP 105 and the associated stations 115 may represent a basic service set (BSS). The various stations 115 in the BSS are able to communicate with one another through the AP 105. Also shown is a coverage area 120 of the AP 105, which may represent a basic service area (BSA) of the WLAN 100. Although not shown in FIG. 1A, the BSS associated with the WLAN 100 is typically connected to a wired or wireless distribution system (DS) that allows multiple APs to be connected in an extended service set.

The AP 105 is configured to communicate bi-directionally with each of the stations 115 using transmissions 130. The transmissions 130 may include downlink transmissions (e.g., beacon frames, IEs) that are sent from the AP 105 to a station 115 as well as uplink transmissions (e.g., acknowledgments or ACK frames) that are sent from a station 115 to the AP 105. Typically, the AP 105 is configured to broadcast its downlink transmissions to the stations 115 that are within the coverage area 120.

In this example, the AP 105 and at least one of the stations 115 may be configured to implement AP-assisted wireless positioning to determine or identify that range (e.g., distance, delay) between the stations 115 and the AP 105. The use of AP-assisted wireless positioning techniques may address some of the issues that typically arise in existing wireless positioning techniques. For example, existing wireless positioning techniques use IEEE 802.11v or 802.11REVmc mechanisms (i.e., connected device configuration) and Frame Exchange Sequences (FES) to obtain position information either at the AP end or at the station end. One of the issues that arises is that the throughput of the link between the AP and the station may be affected because as many as six (6) frames may need to be exchanged to obtain the position of a device. In addition, there may be an increase in the measurement latency as these frames, which are Arbitration Inter-Frame Spacing (AIFS) frames, have to battle channel contention issues, adversely impacting positioning-based applications. Moreover, the overall system throughput may be affected when the AP has to serve multiple stations for positioning measurements and the FES-per-link clogs the network bandwidth. The AP-assisted wireless positioning techniques may provide a framework for wireless positioning that is deterministic in time (e.g., no jitter), has low latency, and/or does not involve a complex FES reducing the impact on network bandwidth.

During operation, the AP 105 may broadcast an IE that identifies an uplink transmission schedule for a set of the stations 115. The IE may be sent at any point in an interval between two successive beacon frames broadcast by the AP 105. In some cases, the set may include all of the stations 115 associated with the AP 105. In other cases, however, the AP 105 may identify the set by selecting a group from those stations associated with the AP 105. The group may be selected based on station clock drifts and/or a ranging accuracy sought by the AP 105, for example.

The AP 105 may broadcast the IE using the downlink portion of the bi-directional transmissions 130. The IE may be configured to identify the stations 115 in the set and to trigger the uplink transmissions (e.g., acknowledgement or ACK frames) from those stations. An example of such an IE is the synchronized coordinate compute (SCC) IE shown in FIG. 4A and described in more detail below. The IE may include at least one field that indicates which of the stations 115 associated with the AP 105 are to send uplink transmissions for ranging or positioning measurements.

The AP 105 may also provide each station with a station identifier (e.g., AID), and with frame spacing and delay parameters, which may be used to determine a distinct backoff for each station in the set. By using distinct and coordinated backoffs the stations 115 in the set may avoid collisions when sending the uplink transmissions (e.g., uplink component of the transmissions 130). In the example of FIG. 1A, each of the stations 115 (e.g., STA_1, . . . , STA_7) may have a unique AID assigned. This unique AID may include an integer value that represents the respective station 115 within the WLAN 100. For example, for STA_1, an AID_1=1 may be assigned. For STA_2, an AID_2=2 may be assigned. Similar assignments may be made for the remaining stations 115 in the WLAN 100 (i.e., STA_3, . . . , STA_7). The AP 105 may be configured to change or adapt the values of the AIDs assigned to the stations 115. The AP 105 may assign the respective AIDs through an IE, for example. The frame spacing and delay parameters may be provided through yet another IE. One such IE may be the SCC parameters IE shown in FIG. 4B and described in more detail below.

The AP 105 may receive the uplink transmissions according to the identified schedule and may determine positioning information such as a range (e.g., RTT) and/or angle of arrival (e.g., AoA) for each station 115 in the set based at least on a time at which the respective uplink transmission is received by the AP 105. The AP 105 may then broadcast the RTTs and/or the AoAs out in a subsequent beacon frame.

The wireless positioning techniques presented herein are referred to as being AP-assisted based on having the AP 105 broadcast an initial IE that coordinates the transmission of ranging frames from multiple stations 115 according to a schedule that avoids frame collisions during a measurement period. It is to be understood, however, that the same or similar approach may be implemented in cases when a station 115 is involved in broadcasting the initial IE, when the positioning measurements are made between different APs 105, and/or when the positioning measurements are made between stations 115. Therefore, the same concepts described herein for AP-assisted wireless positioning may be applied to station-assisted wireless positioning. Similarly, while the wireless positioning techniques presented herein are referenced with respect to uplink transmissions it is to be understood that the same or similar approach may be implemented with respect to downlink transmissions. As such, the schedule of transmissions may be for downlink transmissions, and the subsequently received transmissions may be downlink transmissions. Further, APs 105 may already be on the same channel, or may be switched to the same channel (e.g., by a station 115 or another AP 105).

Figure 1B:
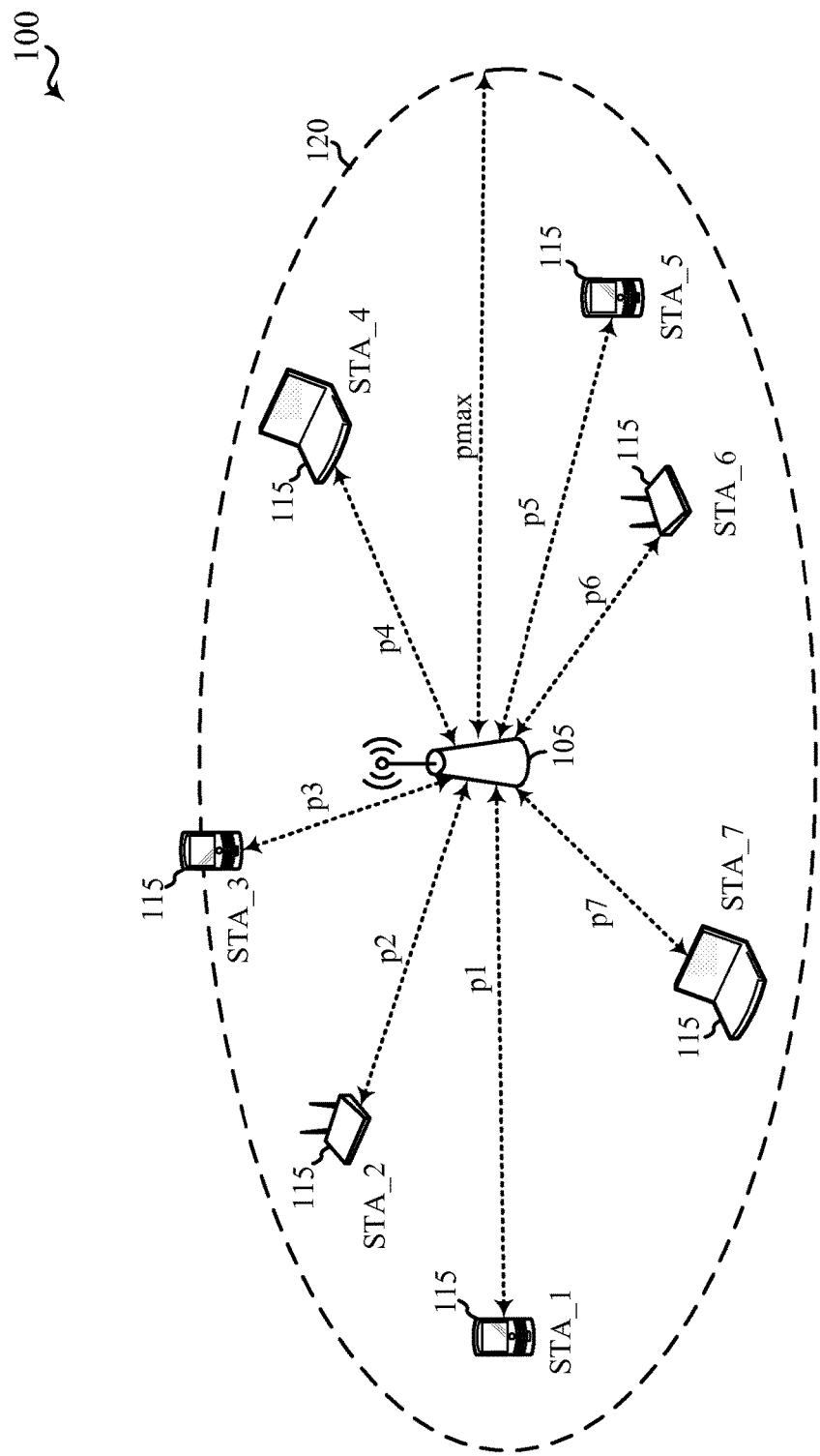
FIG. 1B shows a diagram that illustrates an example of positioning results in a WLAN that supports AP-assisted wireless positioning according to various embodiments.

FIG. 1B shows positioning results produced by the WLAN 100 of FIG. 1A. In this instance, the AP 105 determines a range or distance for each of the stations 115 in the WLAN 100. An RTT (also referred to as a RTT delay) is determined by the AP 105 for each station 115 to represent the range or distance between the AP 105 and the respective station 115. For example, for STA_1, the AP 105 may determine an RTT delay or propagation delay (p1) corresponding to the time it takes for a signal carrying the IE to travel the distance between the AP 105 and the STA_1. For STA_2, the AP 105 may determine an RTT delay or propagation delay (p2) corresponding to the time it takes for the signal carrying the IE to travel the distance between the AP 105 and the STA_1. Similar determinations may be made for the remaining stations in the WLAN 100 (i.e., STA_3 (p3), STA_4 (p4), STA_5 (p5), STA_6 (p6), and STA_7 (p7)).

Also shown in FIG. 1B is pmax, which represents the maximum propagation delay that a station 115 may have within the coverage area 120 of the AP 105. For an AP 105 that provides a coverage that ranges up to about 100 meters (m), for example, the value of pmax may be approximately 300 nanoseconds (ns). For an AP 105 that provides a coverage that ranges up to about 300 m, for example, the value of pmax may be close to 1 microsecond ($\mu s$).

Figure 2:
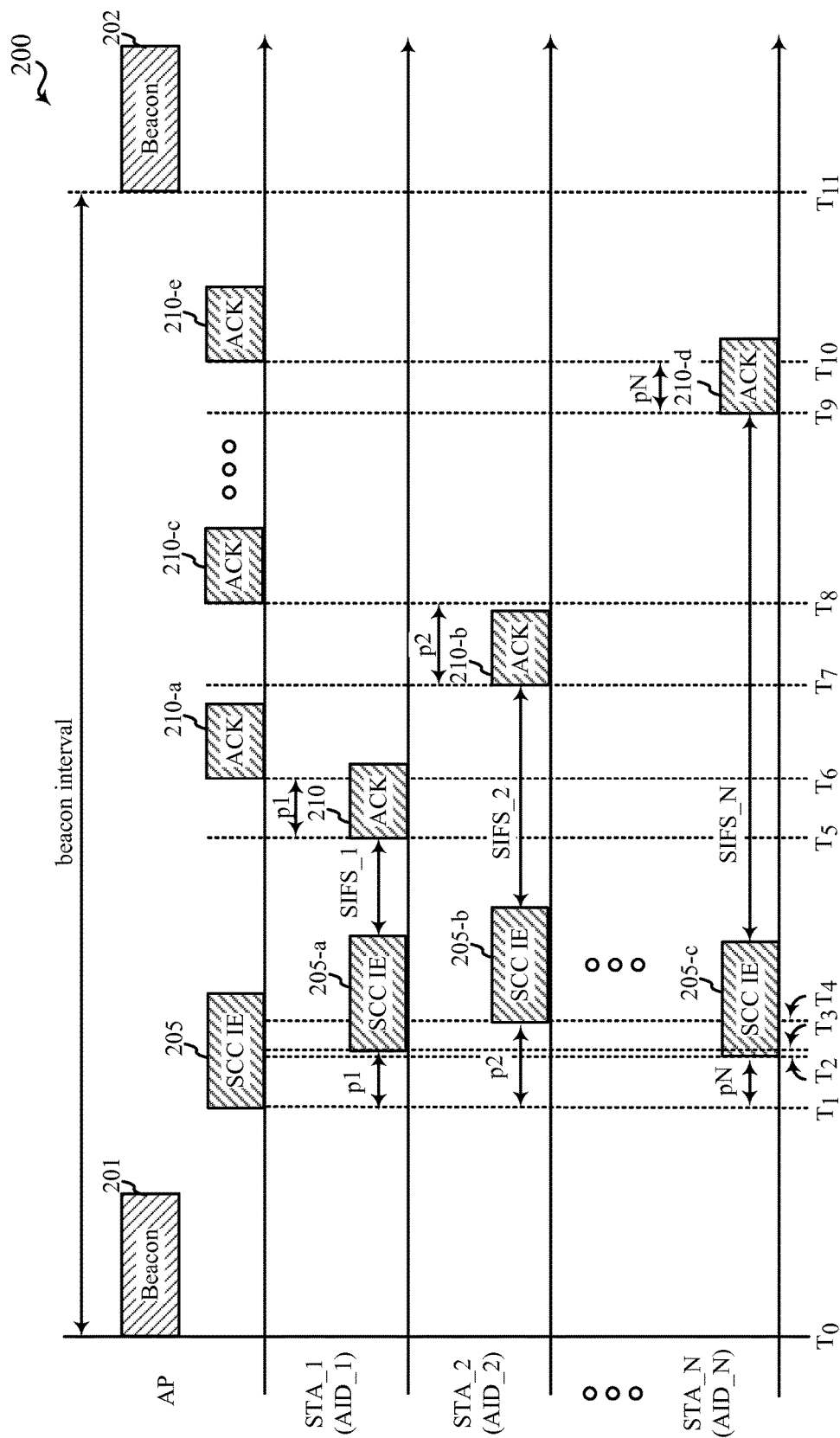
FIG. 2 shows a diagram that illustrates an example of a frame exchange between an AP and multiple stations using an uplink transmission schedule according to various embodiments.

Turning next to FIG. 2, there is shown a diagram 200 that illustrates the timing or scheduling of uplink transmissions (e.g., ACK frames) from different stations to an AP by using distinct backoffs for each of the stations. In this example, an AP such as the AP 105 of FIG. 1A and FIG. 1B, may broadcast a beacon frame 201 at $T_0$. Following the broadcast of the beacon frame 201, or during the broadcast, the AP may also broadcast an SCC IE 205 at $T_1$. The SCC IE 205 may be broadcast during the interval between the beacon frame 201 and a next beacon frame 202 at $T_{11}$. The AP in this scheme acts as a primary ranging-initiator device (RID). The time at which the beacon frames are broadcast may depend on the load and/or ranging capabilities of the AP. The SCC IE 205 may be the SCC IE of FIG. 4A, for example. The reception of this IE not only triggers uplink transmissions for wireless positioning purposes, but may also indicate which stations are to send the uplink transmissions. In this example, a first station (STA_1), a second station (STA_2), and up to an $N^{th}$ station (STA_N) may transmit frames for ranging measurements. The stations may typically transmit ACK frames, however, other types of frames may also be used.

The distance between STA_1 and the AP, the distance between STA_2 and the AP, and the distance between STA_N and the AP may be different. As a result, the propagation delay from the AP to each station may be different and the SCC IE 205 may arrive at each station at a different time. For example, an SCC IE 205-a may represent the arrival at $T_3$ of the SCC IE 205 at STA_1 after a propagation delay (p1). Similarly, an SCC IE 205-b may represent the arrival at $T_4$ of the SCC IE 205 at STA_2 after a propagation delay (p2), which is greater than the propagation delay (p1) of STA_1. Moreover, an SCC IE 205-c may represent the arrival at $T_2$ of the SCC IE 205 at STA_N after a propagation delay (pN), which is greater than the propagation delay (p1) of STA_1 but smaller than the propagation delay (p2) of STA_2.

The timing or scheduling implemented for the uplink transmissions from STA_1, STA_2, and STA_N may be based on information received by the stations from the AP that allows a plurality of them to determine an appropriate and distinct backoff for the uplink transmissions. One approach to generate a distinct backoff is to adjust the short inter-frame space (SIFS) for stations according to information received by the stations. A SIFS generally represents the time interval between a data frame and its acknowledgment. In AP-assisted positioning, for example, the adjustable SIFS for each station may include a common component and an offset. The common component may be the same for all stations and may be represented by SIFSx. The value of SIFSx may range from about 15.1 $\mu s$ to about 16.9 $\mu s$, however, the maximum value may be generally used to determine the backoff. The offset may be different for each station and/or may be based on the AID value assigned to a station. The offset enables a large number of collocated ranging stations to send uplink transmissions without collisions. In other words, the offset allows the uplink transmissions to be orthogonalized. In those cases that the stations are far apart, the significant difference in propagation delay tends to orthogonalize the uplink transmissions. For example, a 1 $\mu s$ offset is equivalent to about 300 m, which means that two stations are not likely to collide as long as the distance difference between the two stations to the AP is less than 300 m.

An example of an expression to obtain the backoff or SIFS for each station is SIFS_n=SIFSx+(AID_n−1)×(ACK_LENGTH+max(p1, . . . , pN)), where n represents the station number, N represents the maximum number of stations, SIFSx is the common component that is the same for all stations, AID_n is AID or association identifier of the $n^{th}$ station, ACK_LENGTH is the length of the ACK frame, and p1, . . . , pN are the respective propagation delays for stations n=1, . . . , N. The values of SIFSx and max(p1, . . . , pN) may be provided by the AP through an IE (e.g., the SCC parameters IE of FIG. 4B), for example.

In one example, for STA_1 (n=1) the distinct backoff to use for uplink transmissions of ACK frames may be determined as SIFS_1=SIFSx+(AID_1−1)×(ACK_LENGTH+ max(p1, . . . , pN)). For STA_2 (n=2) the distinct backoff to use for uplink transmissions of ACK frames may be determined as SIFS_2=SIFSx+(AID_2−1)×(ACK_LENGTH+max(p1, . . . , pN)). For STA_N (n=N) the distinct backoff to use for uplink transmissions of ACK frames may be determined as SIFS_2=SIFSx+(AID_N−1)×(ACK_LENGTH+max(p1, . . . , pN)). Note that if AID_1=1 for STA_1, then the backoff for STA_1 is SIFS_1=SIFSx. Because the association identification numbers are different for each station, if AID_2=2 for STA_2, then the backoff for STA_2 is SIFS_2=SIFSx+(ACK_LENGTH+max(p1, . . . , pN)), which is different from the backoff for STA_1 by the offset (ACK_LENGTH+max(p1, . . . , pN)). Moreover, if AID_N=N for STA_N, then the backoff for STA_N is SIFS_N=SIFSx+(N−1)×(ACK_LENGTH+max(p1, . . . , pN)), which is greater than SIFS_1 and SIFS_2.

Returning to FIG. 2, from the end of the SCC IE 205-$a$, the STA_1 backs off a time SIFS_1 and transmits an ACK frame 210 at $T_5$. Because the propagation delay is substantially the same going back to the AP from STA_1 as it was going to the STA_1 from the AP, the ACK frame 210 is received at the AP as an ACK frame 210-$a$ at $T_6$, a propagation delay (p1) after the time of transmission. Similarly, from the end of the SCC IE 205-$b$, the STA_2 backs off a time SIFS_2 and transmits an ACK frame 210-$b$ at $T_7$. Because the propagation delay is substantially the same going back to the AP from STA_2 as it was going to the STA_2 from the AP, the ACK frame 210-$b$ is received at the AP as an ACK frame 210-$c$ at $T_8$, a propagation delay (p2) after the time of transmission. The same analysis applies to the STA_N, which backs off a time SIFS_N and transmits an ACK frame 210-$d$ that is received by the AP as an ACK 210-$e$ at $T_{10}$, a propagation delay (pN) after the time of transmission. By using distinct backoffs for STA_1 (SIFS_1), for STA_2 (SIFS_2), and for STA_N (SIFS_N), the uplink transmission of ACK 210, ACK-210-$b$, and ACK 210-$d$ to the AP do not collide. This same scheme may be extended to a larger number of stations.

The collision avoidance that may be achieved by using AP-assisted wireless positioning techniques allow ranging or positioning of large pools of stations without causing a lot of overhead time. Even when the ACK frame has the lowest data rate (e.g., 44 μs maximum duration) and a large offset is used (e.g., 1 μs), it is still possible to ensure ranging with a large number of stations without causing too much overhead time. For example, when 100 stations (N=100) are ranged every second, the overall overhead time is approximately [16.9 μs+(100−1)×(44 μs+1 μs)]/1 s=0.447%. The synchronized or coordinated nature of the uplink transmissions may not only be achieved with low overall overhead time, but may also result in a lack of contention issues among AIFS and distributed coordination function (DCF) inter-frame spacing (DIFS), for example.

The accuracy of AP-assisted wireless positioning techniques may depend on any drifts that may occur in the clocks of both the AP and the stations. For example, a typical device clock drift is approximately 25 ppm, so the overall process (considering both AP and station) may introduce 50 ppm of inaccuracy, which may be acceptable for ranging. For example, in a case when there are 10 stations (N=10) and 50 ppm maximum clock drift, the ranging error or inaccuracy for the $10^{th}$ station is approximately [16.9 μs+(10−1)×(44 μs+1 μs)]×50 ppm×speed of light=6.3 m. Because larger sets of stations, such as those found in large deployments (e.g., malls, stadiums, offices), result in large errors, the AP may control how many stations are ranged at any one time to reduce the impact of clock drifting (i.e., to increase accuracy). The AP, through an IE in the beacon frame, may control which stations need send an uplink transmission. A Network Allocator Vector (NAV) may be used to block the medium for those stations that are not ranging during the period of time it takes for the ranging measurements to be completed. The duration of the wireless positioning (i.e., ranging) process, which generally depends on SIFSx, the number of stations, and the coverage area of the WLAN, may be controlled by the AP (or RID).

Figure 3:
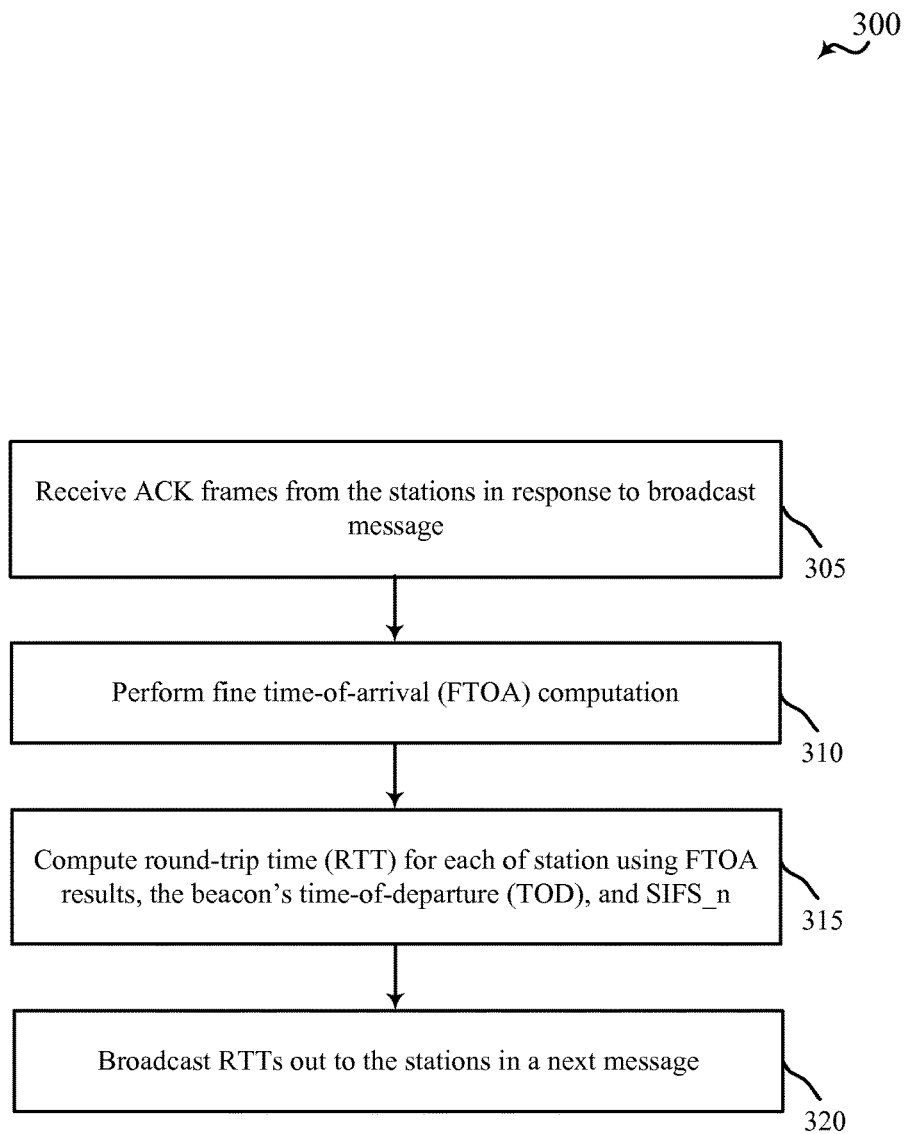
FIG. 3 is a flowchart of an example of a method for AP-assisted wireless positioning according to various embodiments.

FIG. 3 shows a flow diagram of a method 300 for AP-assisted wireless positioning in accordance with various embodiments. The method 300 may be implemented using, for example, the APs 105 of FIG. 1A, FIG. 1B, FIG. 5A, FIG. 5B, FIG. 5C, and FIG. 10; the devices 600 and 600-$a$ of FIG. 6A and FIG. 6B, respectively; the modules 612 and 612-$a$ of FIG. 6B and FIG. 7B, respectively; and/or the WLAN 100 of FIG. 1A and FIG. 1B and the WLAN 500 of FIG. 5A, FIG. 5B, and FIG. 5C.

At block 305, an AP (e.g., the AP 105) may receive ACK frames from at least one station in a WLAN (e.g., the WLAN 100). The ACK frames may be transmitted from the stations in response to a message (e.g., SCC IE 205) broadcast by the AP that identifies a schedule of uplink transmissions for ranging or positioning measurements. The message may also identify which stations in the WLAN are to send the uplink transmissions. At block 310, for each of the ACK frames that are received, the AP may perform a fine time-of-arrival (FTOA) computation for a first path arrival associated with each ACK frame received.

At block 315, since the AP also knows the time-of-departure (TOD) at the antenna port of the IE in the broadcast message that triggered the uplink transmissions, the AP may combine the FTOA of each ACK frame with the TOD, may remove the corresponding backoff for that ACK frame (e.g., SIFS_n), and may compute the RTT for each of the stations that transmitted an ACK frame. At block 320, the AP may broadcast the RTTs out to the stations in a next message (e.g., a next beacon frame).

Turning next to FIG. 4A, a diagram 400 illustrates a synchronized coordinate compute (SCC) IE for AP-assisted wireless positioning. The SCC IE may represent an element that may be used to convey information for wireless positioning techniques in IEEE 802.11 standards. The SCC IE characteristics are illustrated below in Table 1.

TABLE 1

Example SCC IE Characteristics

| Element | Element ID | Length of indicated Element (in Octets) | Extensible |
|---------|------------|------------------------------------------|------------|
| SCC     | 225        | 2 to 6                                   | Yes        |

The SCC IE may be broadcast by an AP (e.g., the AP 105) to those stations associated with the AP. Typically, the SCC IE may be broadcast as part of a beacon frame or some other message from the AP. The AP in this case is considered the primary RID, however, there may be instances in which the primary RID may be an AP station or a non-AP station. The SCC IE may represent an automatic trigger (e.g., an uplink grant) to all the stations that receive the SCC IE, or to a subset indicated by the SCC IE, to begin transmitting ranging frames (e.g., ACK frames) to the RID. The schedule of uplink transmission may be determined by each of the stations based on information provided by the SCC IE and/or by additional information provided to the stations.

In another embodiment, the selection of stations to be ranged may be indicated by a partial virtual map used for traffic information map (TIM) element notification. In this case, each bit may be 1:1 map to an AID. Since the partial virtual map may have 2008 bits, the association identifications mapped are AID_0, . . . , AID_2007. Therefore, when bit 0 is set, the station associated with AID_0 is selected for ranging. A similar approach may be followed with the other bits in the partial virtual map. This information may be conveyed in the SCC IE and/or in a different IE.

As shown in FIG. 4A, the SCC IE may include an element ID field 405 (e.g., 1 octet) and a length field 410 (e.g., 1 octet). The SCC IE may optionally include an AID_First field 415 (e.g., 2 octets) and an AID_Last field 420 (e.g., 2 octets). The element ID field 405 may be set to the value specified Table 1, which is 225. In one example, the length field 410 may be set to either 0 or 4. When it is set to 0, there is no AID_First field 415 nor AID_Last field 420 in the SCC IE. In this case, all of the stations that receive the SCC IE need to respond by transmitting ranging frames (e.g., ACK frames). When it is set to 4, the AID_First field 415 and the AID_Last field 420 are included in the SCC IE, and those stations that have been assigned an AID that is in the range identified the AID_First field 415 and the AID_Last field 420 need to respond by transmitting ranging frames (e.g., ACK frames).

The AID_First field 415 may contain the AID of the first station that is to respond to the SCC IE. The AID_Last field 420 may contain the AID of the last station that is to respond to the SCC IE. The AID may be assigned by an AP during association and may include a 16-bit ID to represents a station.

Turning to FIG. 4B, a diagram 430 illustrates an SCC parameters IE for AP-assisted wireless positioning. The SCC parameters IE may represent an element that may be used to convey information for wireless positioning techniques in IEEE 802.11 standards. The SCC Parameters IE characteristics are illustrated below in Table 2.

TABLE 2

Example SCC parameters IE Characteristics

| Element | Element ID | Length of indicated Element (in Octets) | Extensible |
|---|---|---|---|
| SCC Parameters | 226 | 1 to 10 | Yes |

The SCC Parameters IE is broadcast by an AP (e.g., AP 105) to convey SIFSx and max(p1, . . . , pN) to the stations associated with the AP so that those stations may control their backoff. The SCC parameters IE need not be sent regularly. For example, the SCC Parameters IE may be broadcast once in the wireless network and may be broadcast again when a new station joins the network or when at least one parameter needs to be updated.

As shown in FIG. 4B, the SCC parameters IE may include an element ID field 435 (e.g., 1 octet) and a length field 440 (e.g., 1 octet). The SCC parameters IE may also include a SIFSx field 445 (e.g., 2 octets) and a Max_p field 450 (e.g., 2 octets). The element ID field 435 may be set to the value specified Table 2, which is 226. In one example, the length field 440 may be set to 4. The SIFSx field 445 may contain the value of SIFSx. In one example, the value of SIFSx in the SIFSx field 445 may be provided with a specified unit of time (e.g., nanoseconds). The Max_p field 450 may contain the value of max(p1, . . . , pN). In one example, the value of max(p1, . . . , pN) in the Max_p field 450 may be provided with a specified unit of time (e.g., nanoseconds).

As noted above the value of SIFSx may range from about 15.1 µs to about 16.9 µs. The AP may typically broadcast the maximum time for SIFSx using the SCC Parameters IE. However, there may be instances in which a smaller value of SIFSx may be sufficient to ensure that uplink transmissions during the ranging process do not collide. In those instances, the AP may adapt the value of SIFSx and may broadcast a new SCC Parameters IE to have the stations update SIFSx. Similarly, the value of max(p1, . . . , pN) may be adapted by the AP, which may in turn broadcast a new SCC parameters IE to have the stations update max(p1, . . . , pN).

Figure 5A:
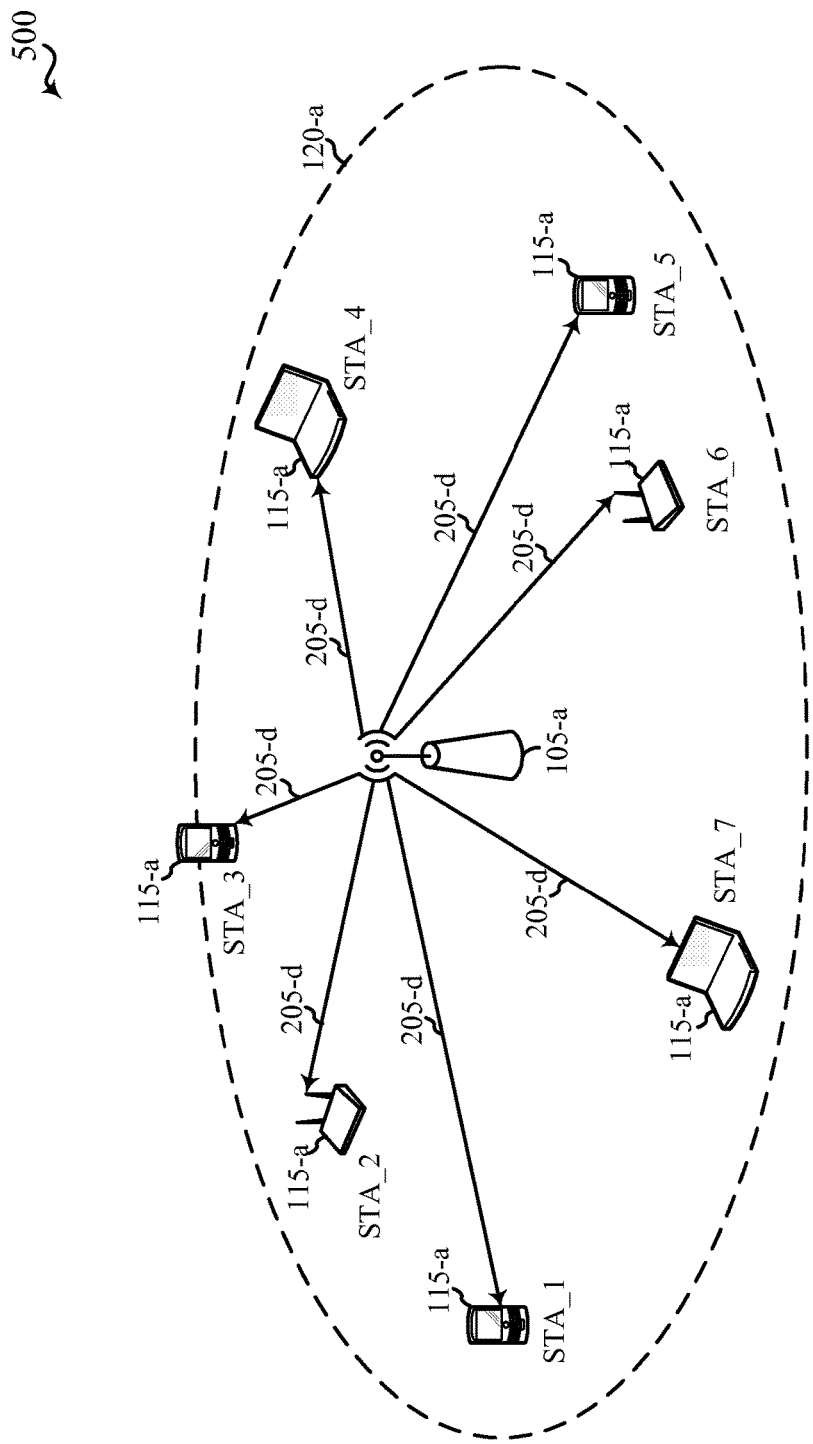
FIG. 5A shows a diagram that illustrates an example of an AP broadcasting an SCC IE for AP-assisted wireless positioning according to various embodiments.

FIG. 5A shows a WLAN or Wi-Fi network 500 that is configured to provide AP-assisted wireless positioning. The WLAN 500 may be an example of the WLAN 100 of FIG. 1A and FIG. 1B. The WLAN 500 may include an AP 105-*a* and multiple associated stations 115-*a*, which may be examples of the corresponding devices described above with respect to FIG. 1A and FIG. 1B. Like the WLAN 100, the WLAN 500 includes (7) stations 115-*a* identified as STA_1, STA_2, STA_3, STA_4, STA_5, STA_6, and STA_7. Also shown is a coverage area 120-*a* of the AP 105-*a*, which may represent a BSA of the WLAN 500.

During a ranging operation, the AP 105-*a* (which may be considered a primary RID), may broadcast SCC IEs 205-*d*, which may be examples of the SCC IEs 205 in FIG. 2 and the SCC IE described in FIG. 4A. The SCC IEs 205-*d* are received at different times at the stations 115-*a* based on their respective propagation delays from the AP 105-*a* (see FIG. 2). The SCC IEs 105-*d* may include an AID_First field and an AID_Last field to indicate which of the stations receiving the SCC IEs 205-*d* need to send ranging frames to the AP 105-*a*.

Figure 5B:
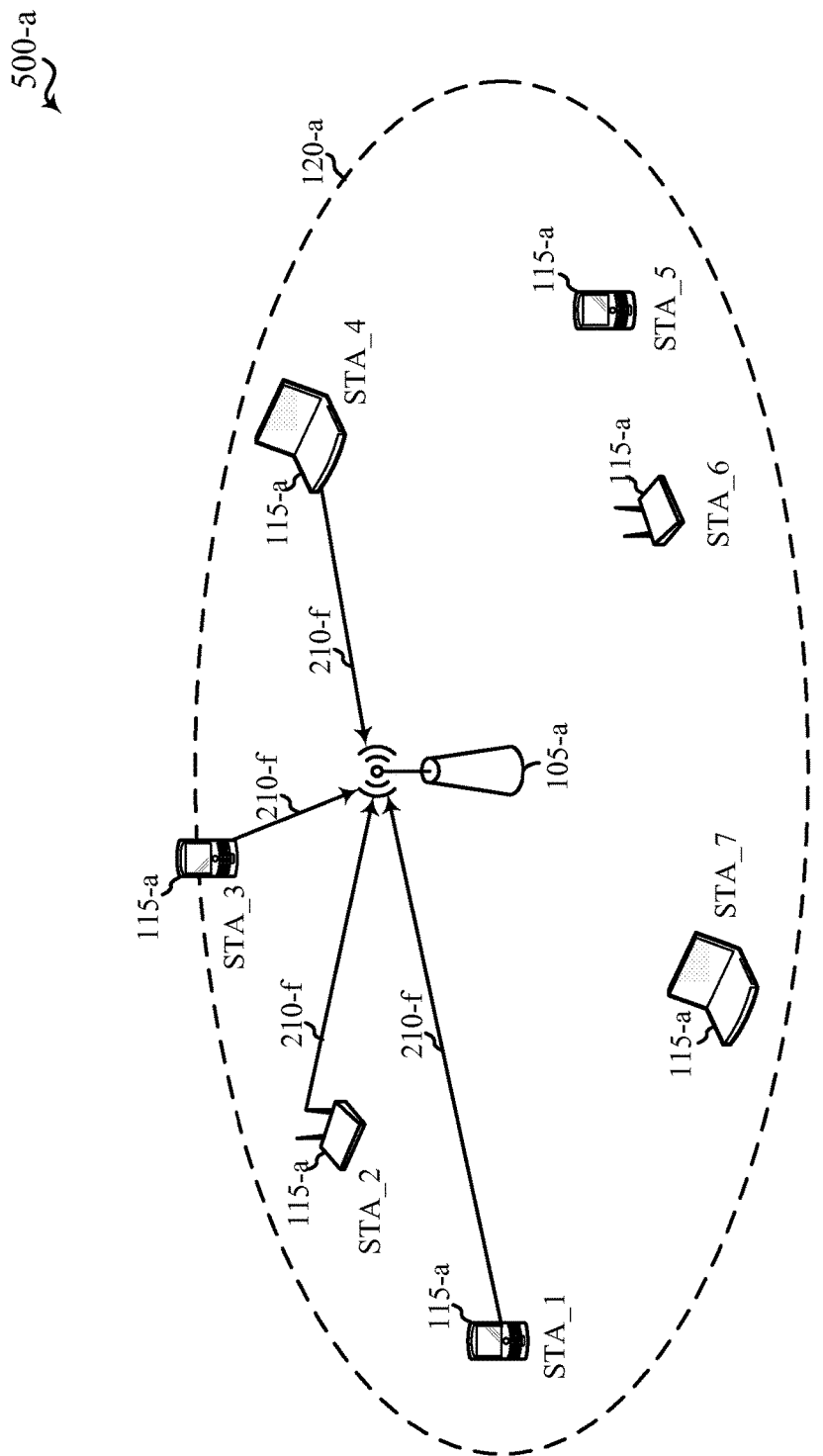
FIG. 5B shows a diagram that illustrates an example of uplink transmissions from one set of stations according to various embodiments.

In the example in FIG. 5B, the AID_First field included in the SCC IE 205-*d* broadcast by the AP 105-*a* in FIG. 5A has identified STA_1 as the first station to send uplink transmissions to the AP 105-*a*. Moreover, the AID_Last field in the SCC IE 205-*d* has identified STA_4 as the last station to send uplink transmissions to the AP 105-*a*. Each of these stations may determine its own distinct backoff based on SIFSx, AID, and max(p1, . . . , pN), which are provided to the stations by the AP 105-*a*. Then, according to the schedule identified by the information in the SCC IE 205-*d* (and/or by other information available to the stations), each of STA_1, STA_2, STA_3, and STA_4 may send ACK frames 210-*f* to the AP 105-*a* for making ranging measurements. The remaining stations, STA_5, STA_6, and STA_7, which were not triggered to send uplink transmissions by the reception of the SCC IEs 205-*d*, may not access the medium during the ranging process in accordance with an SCC IE NAV.

Once the AP 105-*a* has received the ACK frames 210-*f* from STA_1, STA_2, STA_3, and STA_4, it may proceed to determine RTT and/or AoA for each of the stations as described above with respect to FIG. 3, and to subsequently broadcast the results back to the stations in a next beacon frame, for example.

Figure 5C:
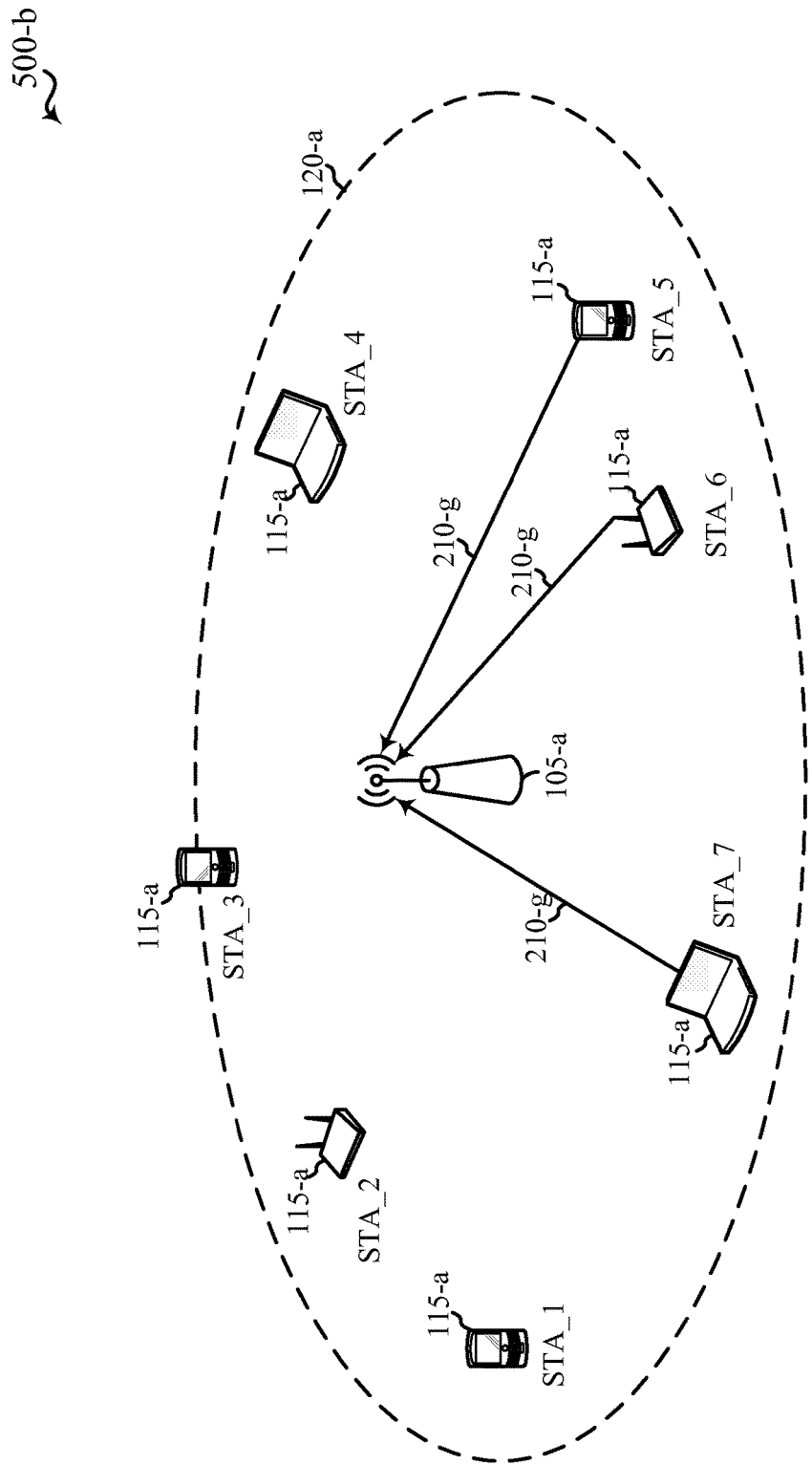
FIG. 5C shows a diagram that illustrates an example of uplink transmissions from a different set of stations according to various embodiments.

In the example in FIG. 5C, the AID_First field included in the SCC IE 205-*d* broadcast by the AP 105-*a* in FIG. 5A has identified STA_5 as the first station to send uplink transmissions to the AP 105-*a*. Moreover, the AID_Last field in the SCC IE 205-*d* has identified STA_7 as the last station to send uplink transmissions to the AP 105-*a*. Each of these stations may determine its own distinct backoff time based on SIFSx, AID, and max(p1, . . . , pN), which are provided to the stations by the AP 105-*a*. Then, according to the schedule identified by the information in the SCC IE 205-*d*

(and/or by other information available to the stations), each of STA_5, STA_6, and STA_7 may send ACK frames 210-*g* to the AP 105-*a* for making ranging measurements. The remaining stations, STA_1, STA_2, STA_3, and STA_4, which were not triggered to send uplink transmissions by the reception of the SCC IEs 205-*d*, may not access the medium during the ranging process in accordance with an SCC IE NAV.

Once the AP 105-*a* has received the ACK frames 210-*g* from STA_5, STA_6, and STA_7, it may proceed to determine RTT and/or AoA for each of the stations as described above with respect to FIG. 3, and to subsequently broadcast the results back to the stations.

As described above, the AP 105-*a* may perform ranging operations on less than all the associated stations to reduce the number of stations being measured and thereby reducing the ranging inaccuracies or errors that may result from clock drifts. In this regard, the AP 105-*a* may be configured not only to provide information that identifies an uplink transmission schedule for those stations being measured, but may also be configured to identify different sets of stations and a schedule of when to perform a ranging operation on those sets.

Figure 6A:
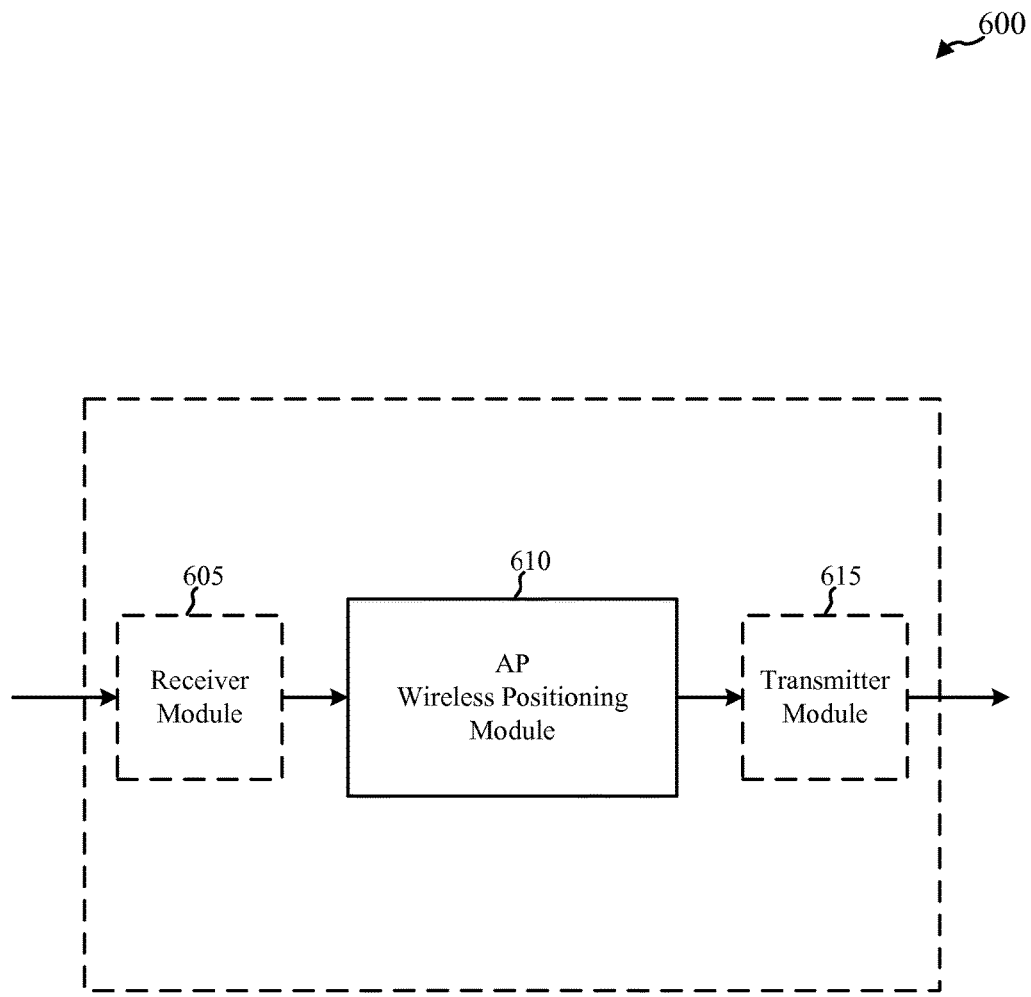
FIG. 6A shows a diagram that illustrates an example of a device in an AP that is used for AP-assisted wireless positioning according to various embodiments.

Turning next to FIG. 6A, a block diagram illustrates a device 600 that is used in an AP for AP-assisted wireless positioning. The device 600 may be an example of one or more aspects of the APs 105 described with reference to FIG. 1A, FIG. 1B, FIG. 5A, FIG. 5B, FIG. 5C, and FIG. 10. The device 600, or portions of it, may also be a processor. The device 600 may include a receiver module 605, an AP wireless positioning module 610, and/or a transmitter module 615. Each of these components may be in communication with each other.

The device 600, through the receiver module 605, the AP wireless positioning module 610, and/or the transmitter module 615, may be configured to perform functions described herein. For example, the device 600 may be configured to broadcast a message (e.g., SCC IE) that identifies a schedule of transmissions (e.g., ACK frames) for a set of stations. The message may be sent at any point during a beacon frame interval, for example. The schedule identifies a distinct backoff (e.g., SIFS_n) for the transmission from each of the stations. The distinct backoff for each of the stations may be based at least on a respective station identifier (e.g., AID_n). The broadcast message may identify each of the stations in the set (e.g., AID_First, AID_Last). Knowing the stations in the set may be used to identify the schedule of transmissions.

The device 600 may be configured to receive a transmission from each of the stations transmitted according to the identified schedule and determine a range (e.g., RTT, AoA) for each of the stations based at least on a time at which the respective transmission is received.

In some embodiments, the device 600 is configured to identify a frame spacing parameter (e.g., SIFSx) and a delay parameter (e.g., max(p1, . . . , pN)) to be used for determining the schedule. The device 600 may be configured to adapt one or both of the frame spacing and delay parameters (e.g., SCC parameters IE) based at least on the ranges determined for the stations. The device 600 may be configured to identify the frame spacing parameter by first exchanging packets with each of the stations to determine multiple frame spacing parameters (e.g., SIFS) for the stations and then identify the largest of those frame spacing parameters to be used for determining the schedule (e.g., to be used as SIFSx).

In some embodiments, the device 600 is configured to identify the stations in the set from stations associated with an access point (e.g., AP 105). The stations in the set may be identified based at least on a ranging accuracy sought by the access point. The device 600 may be configured to estimate clock drifts for multiple stations and identify the stations in the set based at least on the estimated clock drifts.

In some embodiments, the device 600 is configured to assign a station identifier (e.g., AID_n) to each of the stations in the set to define an order of transmissions in the schedule. The device 600 may be configured to define the order of transmissions in the schedule according to a clock drift or a ranging accuracy sought for each respective station.

In some embodiments, the device 600 is configured to determine a duration of the scheduled transmissions and to direct stations outside the set to avoid transmissions during the duration of the scheduled transmissions.

Figure 6B:
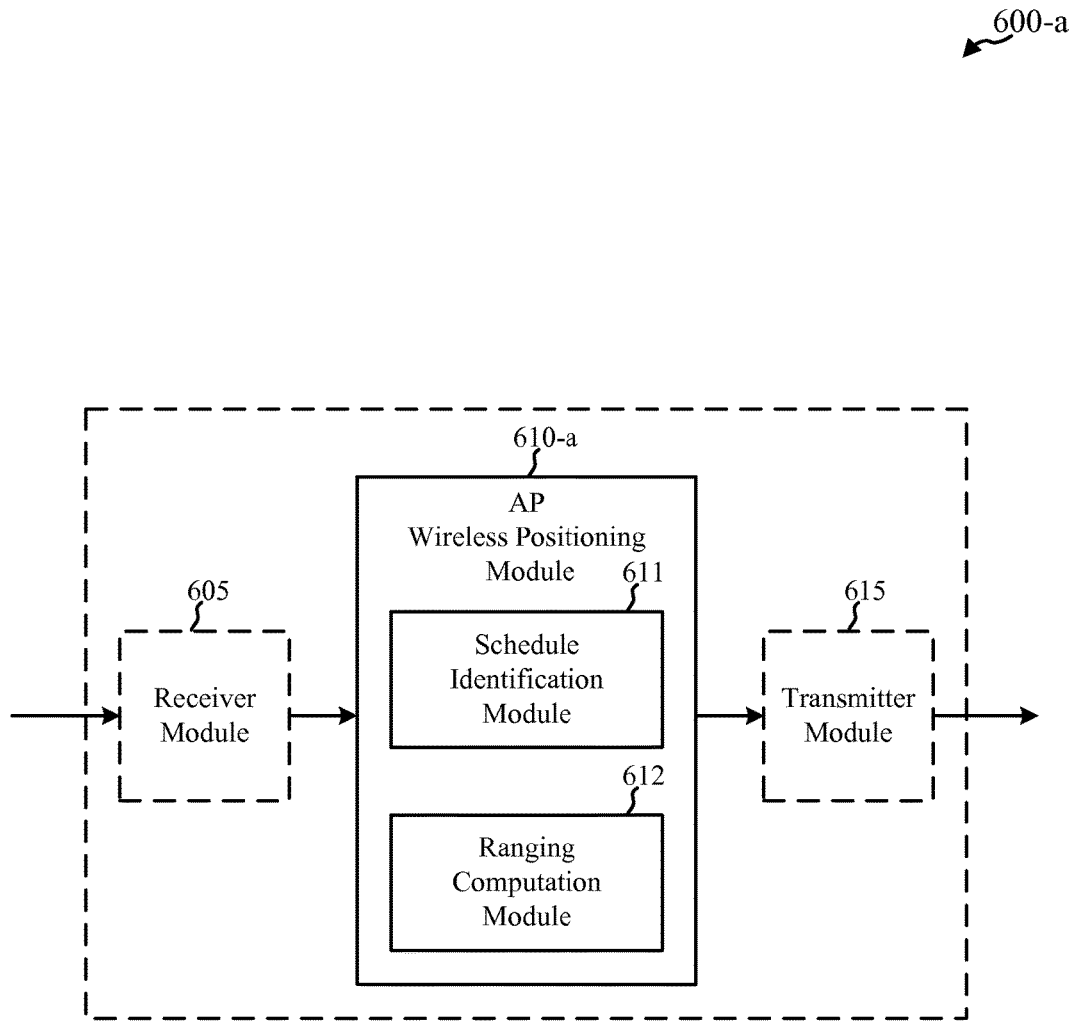
FIG. 6B shows a diagram that illustrates another example of a device in an AP that is used for AP-assisted wireless positioning according to various embodiments.

Turning to FIG. 6B, a block diagram illustrates a device 600-*a* that is used in an AP for AP-assisted wireless positioning. The device 600-*a* may be an example of the device 600 of FIG. 6A. Moreover, the device 600-*a* may be an example of one or more aspects of the APs 105 described with reference to FIG. 1A, FIG. 1B, FIG. 5A, FIG. 5B, FIG. 5C, and FIG. 10. The device 600-*a*, or portions of it, may also be a processor. The device 600-*a* may include the receiver module 605, an AP wireless positioning module 610-*a*, and/or the transmitter module 615. Each of these components may be in communication with each other.

The AP wireless positioning module 610-*a* may be an example of the AP wireless positioning module 610 of FIG. 6A and may perform the same or similar functions. The AP wireless positioning module 610-*a* may include a schedule identification module 611 and a ranging computation module 612. The schedule identification module 611 may be configured to perform those aspects of the AP wireless positioning module 610-*a* associated with determining, identifying, and broadcasting information (e.g., beacon frames, SSC IE, SSC parameters IE) to schedule a ranging operation such that transmissions from various stations do not collide. The ranging computation module 612 may be configured to perform those aspects of the AP wireless positioning module 610-*a* associated with receiving (e.g., ACK frames) and processing information to determine ranging information (e.g., RTT, AoA) for at least one station. For example, the ranging computation module 612 may be configured to perform the same or similar functions as those described above with respect to FIG. 3.

Figure 7A:
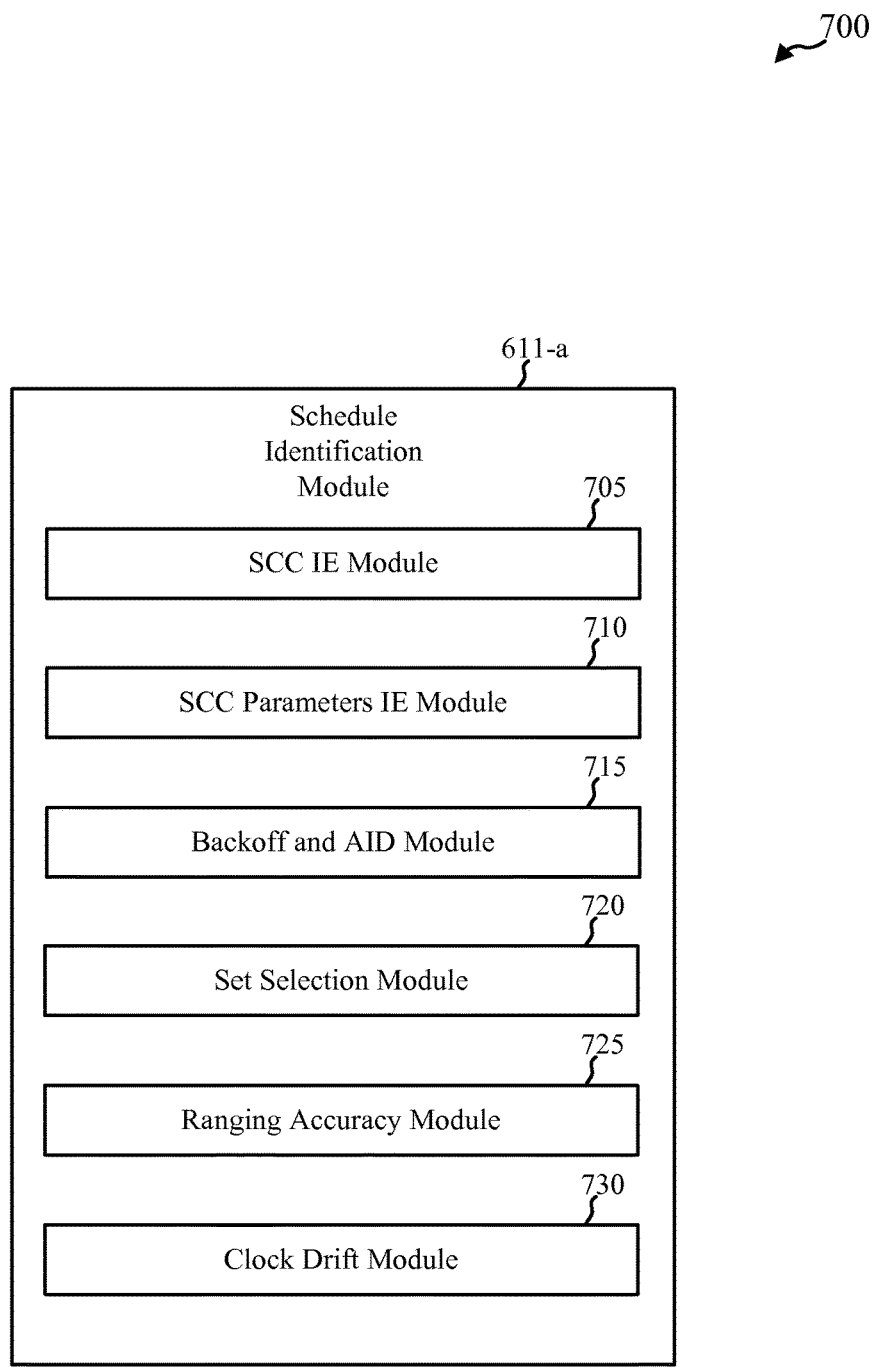
FIG. 7A shows a diagram that illustrates an example of a schedule identification module in an AP according to various embodiments.

FIG. 7A shows a diagram 700 that includes a schedule identification module 611-*a* that is used in an AP for AP-assisted wireless positioning. The schedule identification module 611-*a* may be an example of the schedule identification module 611 of FIG. 6B, and may include an SCC IE module 705, an SCC parameters IE module 710, a backoff and AID module 715, a set selection module 720, a ranging accuracy module 725, and a clock drift module 730. Each of these components may be in communication with each other.

The SCC IE module 705 may be configured to handle aspects related to determining and identifying information (e.g., AID_First, AID_Last) to include in an SCC IE. The SCC parameters module 710 may be configured to handle aspects related to determining and identifying information (e.g., SIFSx, max(p1, . . . , pN)) to include in an SCC parameters IE. The backoff and AID module 715 may be configured to handle aspects related to determining, identifying, and assigning information related to the generation of distinct backoff times by different stations during a ranging operation. The set selection module 720 may be configured to handle aspects related to determining, identifying, and selecting stations to include in at least one set for making ranging measurements. The ranging accuracy module 725 may be configured to handle aspects related to determining and identifying a ranging accuracy. The clock drift module 730 may be configured to handle aspects related to estimating clock drifts for use in ranging accuracy computations.

Figure 7B:
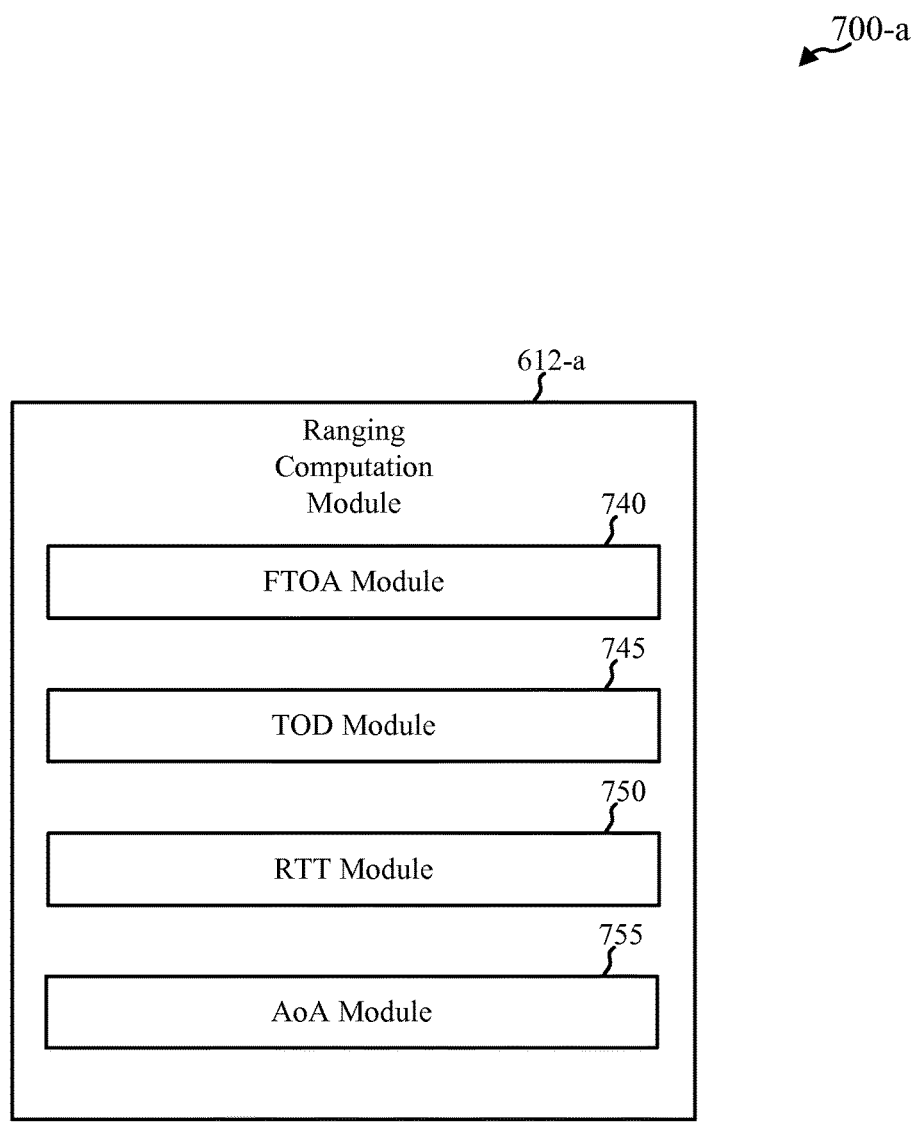
FIG. 7B shows a diagram that illustrates an example of a ranging computation module in an AP according to various embodiments.

FIG. 7B shows a diagram 700-a that includes a ranging computation module 612-a that is used in an AP for AP-assisted wireless positioning. The ranging computation module 612-a may be an example of the ranging computation module 612 of FIG. 6B, and may include an FTOA module 740, a TOD module 745, an RTT module 750, and an AoA module 755. Each of these components may be in communication with each other.

The FTOA module 740 may be configured to handle aspects related to determining, identifying, and processing information related to the time of arrival of transmissions from stations. The TOD module 745 may be configured to handle aspects related to determining and identifying a time of departure of beacon frames from an AP. The RTT module 750 may be configured to handle aspects related to determining and identifying a propagation delay or round-trip time delay for each of the stations that sent transmissions during the ranging operation. The AoA module 755 may be configured to handle aspects related to determining and identifying an angle of arrival (e.g., for an antenna array) of the transmissions sent by the stations during the ranging operation.

Figure 8A:
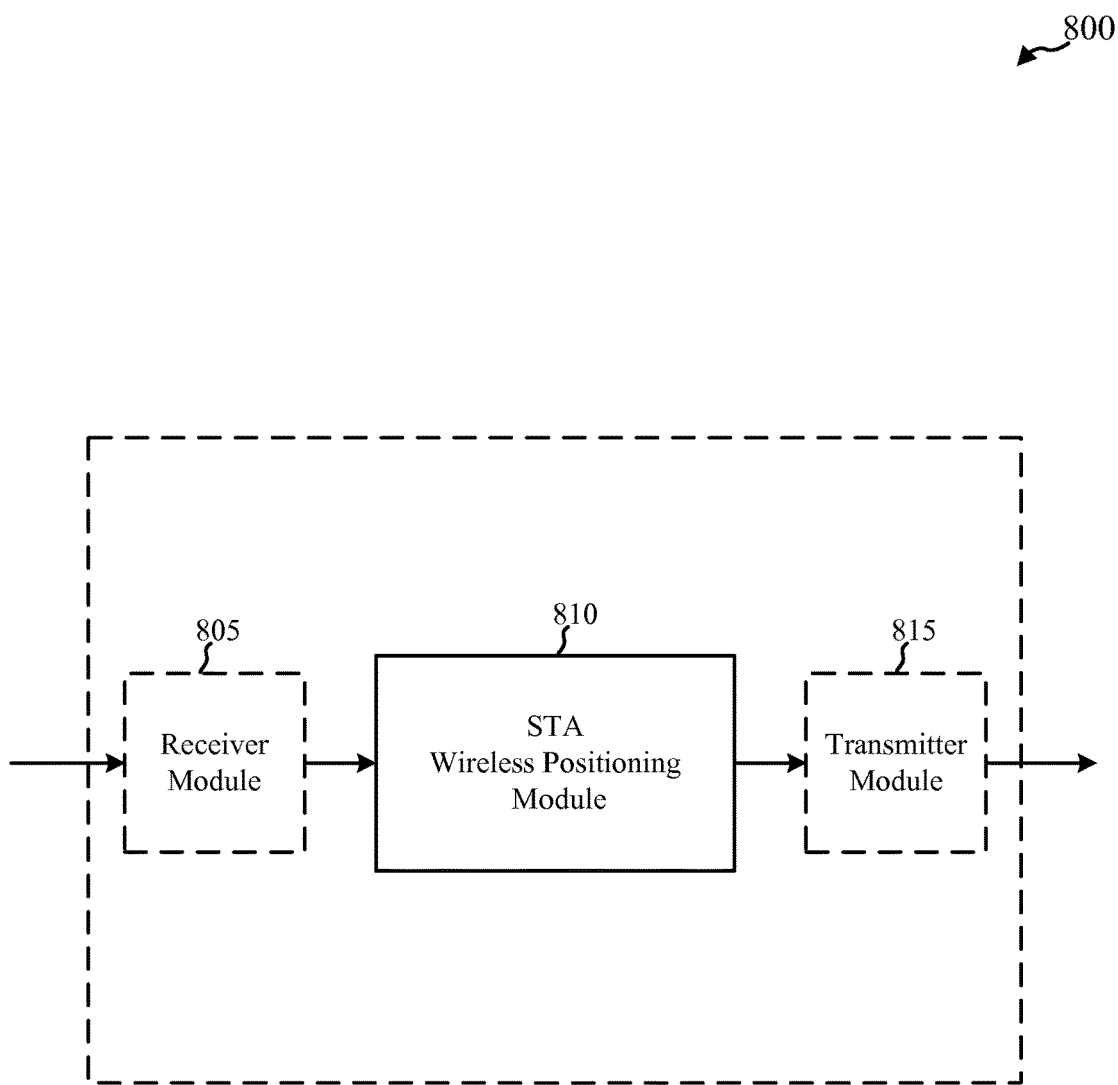
FIG. 8A shows a diagram that illustrates an example of a device in a station that is used for AP-assisted wireless positioning according to various embodiments.

Turning next to FIG. 8A, a block diagram illustrates a device 800 that is used in a station for AP-assisted positioning. The device 800 may be an example of one or more aspects of the stations 115 described with reference to FIG. 1A, FIG. 1B, FIG. 5A, FIG. 5B, FIG. 5C, and FIG. 11. The device 800, or portions of it, may also be a processor. The device 800 may include a receiver module 805, an STA wireless positioning module 810, and/or a transmitter module 815. Each of these components may be in communication with each other.

The device 800, through the receiver module 805, the STA wireless positioning module 810, and/or the transmitter module 815, may be configured to perform functions described herein. For example, the device 800 may be configured to receive a message (e.g., SCC IE) from an AP that identifies a schedule of transmissions for a set of stations. The device 800 may determine whether to send transmissions in response to receiving the broadcast message. For example, the device 800 may inspect the contents of the broadcast message to determine whether to respond to the broadcast message by sending transmissions (e.g., ACK frames).

The device 800, when responding to the broadcast message by sending transmissions, may determine a backoff (e.g., SIFS_n) based on information provided by the AP (e.g., SIFSx, AID_n, max(p1, ..., pN)), and may be configured to send the transmissions in accordance with the backoff.

Figure 8B:
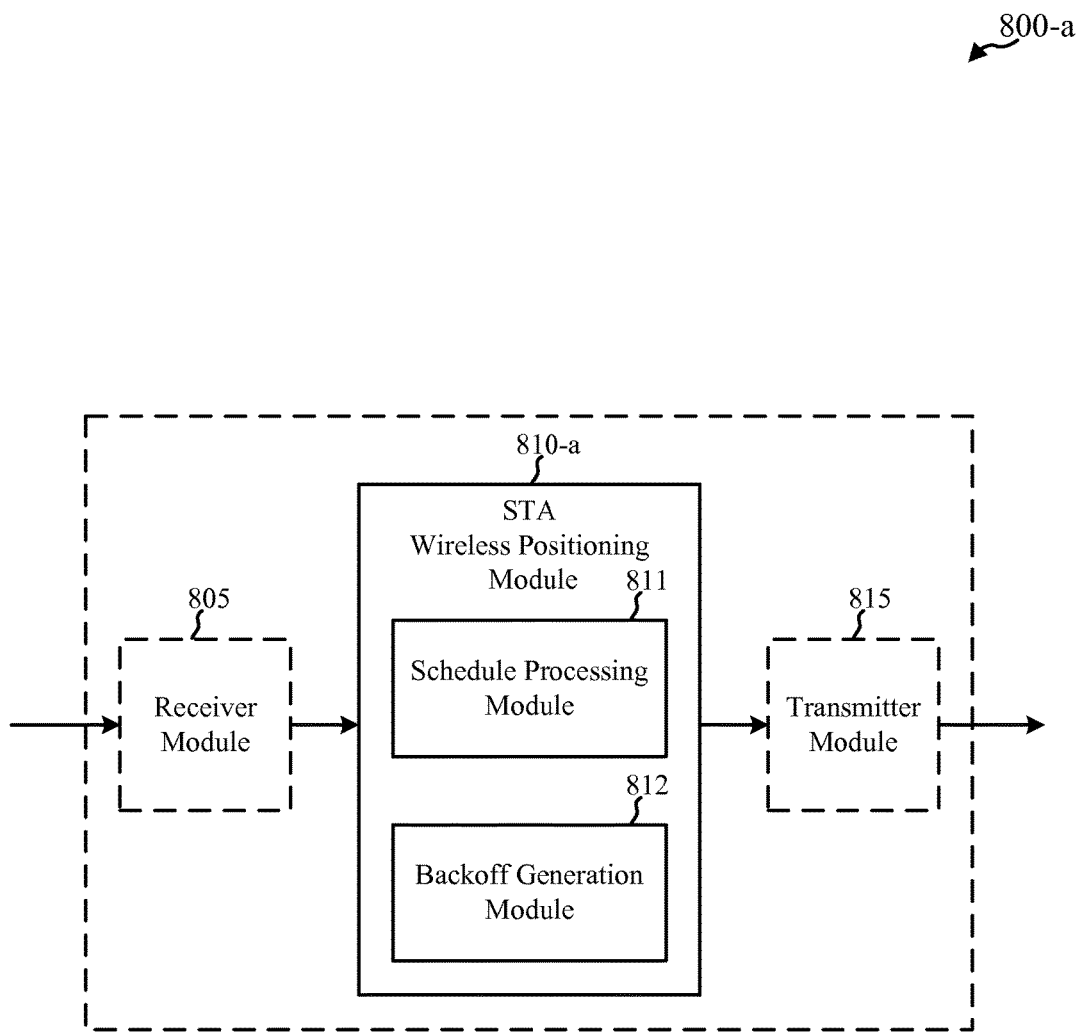
FIG. 8B shows a diagram that illustrates another example of a device in a station that is used for AP-assisted wireless positioning according to various embodiments.

Turning to FIG. 8B, a block diagram illustrates a device 800-a that is used in a station for AP-assisted positioning. The device 800-a may be an example of the device 800 of FIG. 8A. Moreover, the device 800-a may be an example of one or more aspects of the stations 115 described with reference to FIG. 1A, FIG. 1B, FIG. 5A, FIG. 5B, FIG. 5C, and FIG. 11. The device 800-a, or portions of it, may also be a processor. The device 800-a may include the receiver module 805, an STA wireless positioning module 810-a, and/or the transmitter module 815. Each of these components may be in communication with each other.

The STA wireless positioning module 810-a may be an example of the STA wireless positioning module 810 of FIG. 8A and may perform the same or similar functions. The STA wireless positioning module 810-a may include a schedule processing module 811 and a backoff generation module 812. The schedule processing module 811 may be configured to perform those aspects of the STA wireless positioning module 810-a associated with determining, identifying, inspecting, and processing broadcast information (e.g., SSC IE, SSC parameters IE) received in connection with a schedule for a ranging operation such that transmissions from various stations do not collide. The backoff generation module 812 may be configured to perform those aspects of the STA wireless positioning module 810-a associated with determining and applying a distinct backoff based on the broadcast information received.

Figure 9:
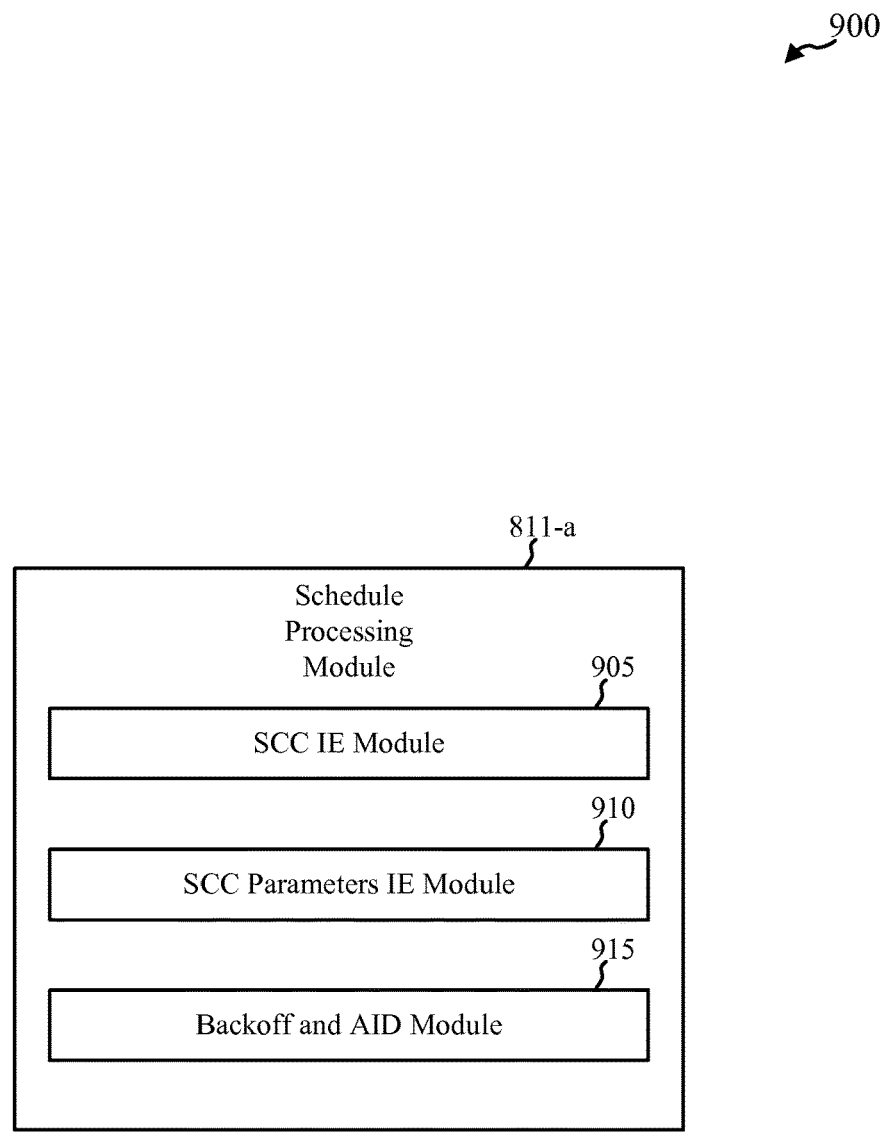
FIG. 9 shows a diagram that illustrates an example of a schedule identification module in a station according to various embodiments.

FIG. 9 shows a diagram 900 that includes a schedule processing module 811-a that is used in a station for AP-assisted positioning. The schedule processing module 811-a may be an example of the schedule processing module 811 of FIG. 8B, and may include an SCC IE module 905, an SCC parameters IE module 910, and a backoff and AID module 915. Each of these components may be in communication with each other.

The SCC IE module 905 may be configured to handle aspects related to determining, identifying, and applying information (e.g., AID_First, AID_Last) received from an SCC IE. The SCC parameters module 710 may be configured to handle aspects related to determining, identifying, and applying information (e.g., SIFSx, max(p1, ..., pN)) received from an SCC parameters IE. The backoff and AID module 715 may be configured to handle aspects related to determining, identifying, and applying a distinct backoff that is based on a respective station identifier (e.g., AID_n).

Figure 10:
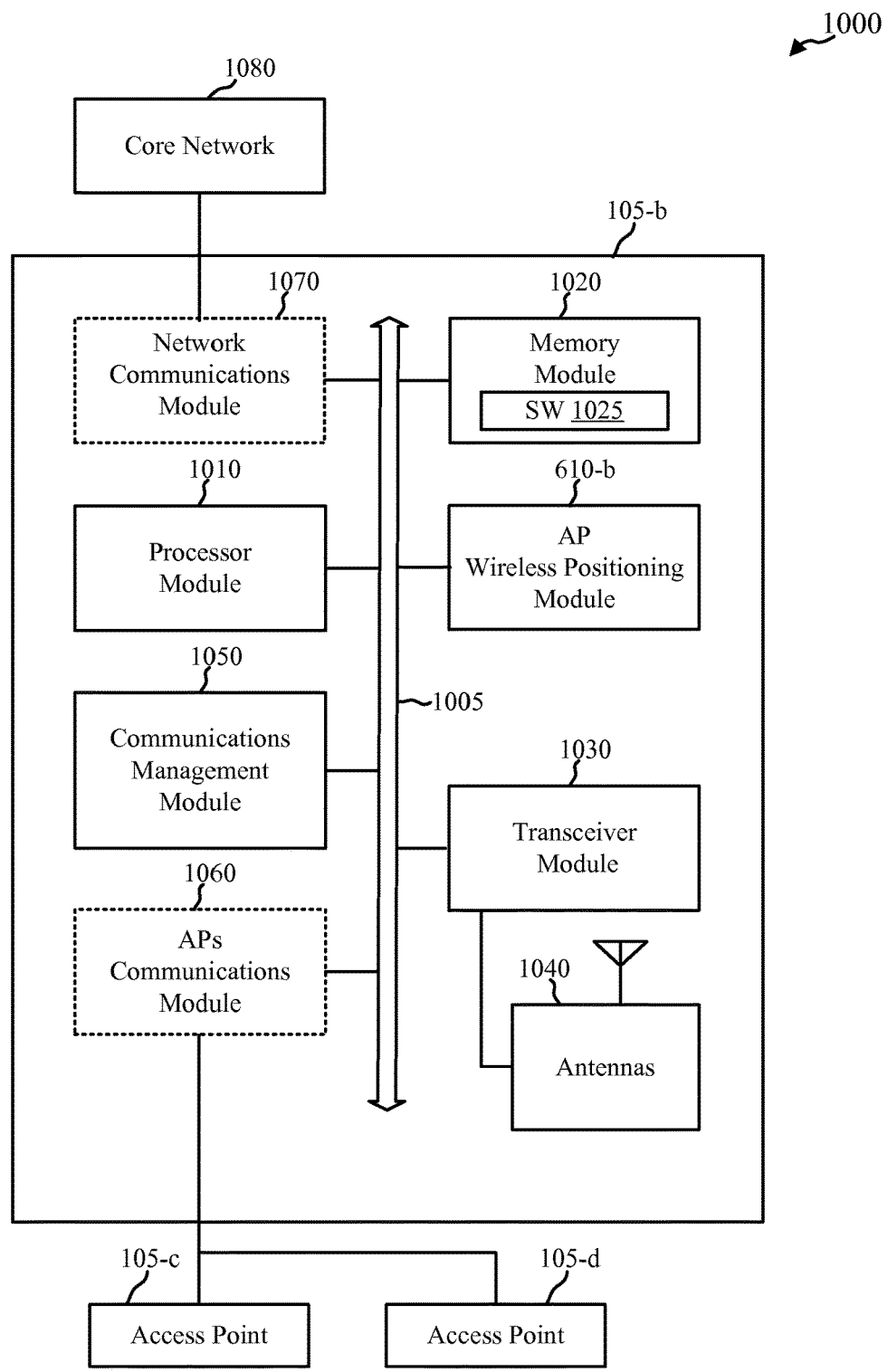
FIG. 10 shows a block diagram that illustrates an example of an AP architecture according to various embodiments.

Turning to FIG. 10, a diagram 1000 is shown that illustrates an access point or AP 105-b configured for AP-assisted wireless positioning. In some embodiments, the AP 105-b may be an example of the APs 105 of FIG. 1A, FIG. 1B, FIG. 5A, FIG. 5B, and FIG. 5C. The AP 105-b may include a processor module 1010, a memory module 1020, a transceiver module 1030, antennas 1040, and an AP wireless positioning module 610-b. The AP wireless positioning module 610-b may be an example of the AP wireless positioning modules 610 and 610-b of FIG. 6A and FIG. 6B, respectively. In some embodiments, the AP 105-b may also include one or both of an APs communications module 1060 and a network communications module 1070. Each of these components may be in communication with each other, directly or indirectly, over at least one bus 1005.

The memory module 1020 may include random access memory (RAM) and read-only memory (ROM). The memory module 1020 may also store computer-readable, computer-executable software (SW) code 1025 containing instructions that are configured to, when executed, cause the processor module 1010 to perform various functions described herein for AP-assisted wireless positioning, for example. Alternatively, the software code 1025 may not be directly executable by the processor module 1010 but be configured to cause the computer, e.g., when compiled and executed, to perform functions described herein.

The processor module 1010 may include an intelligent hardware device, e.g., a central processing unit (CPU), a microcontroller, an application-specific integrated circuit (ASIC), etc. The processor module 1010 may process information received through the transceiver module 1030, the APs communications module 1060, and/or the network communications module 1070. The processor module 1010 may also process information to be sent to the transceiver module 1030 for transmission through the antennas 1040, to the APs communications module 1060, and/or to the network communications module 1070. The processor module 1010 may handle, alone or in connection with AP wireless positioning module 610-b, various aspects related to ranging operations using AP-assisted wireless positioning techniques.

The transceiver module 1030 may include a modem configured to modulate the packets and provide the modulated packets to the antennas 1040 for transmission, and to demodulate packets received from the antennas 1040. The transceiver module 1030 may be implemented as at least one transmitter module and at least one separate receiver module. The transceiver module 1030 may be configured to communicate bi-directionally, via the antennas 1040, with at least one station 115 as illustrated in FIG. 1A, FIG. 1B, FIG. 5A, FIG. 5B, and FIG. 5C, for example. The AP 105-b may typically include multiple antennas 1040 (e.g., an antenna array). The AP 105-b may communicate with a core network 1080 through the network communications module 1070. The AP 105-b may communicate with other APs, such as the access point 105-c and the access point 105-d, using an APs communications module 1060.

According to the architecture of FIG. 10, the AP 105-b may further include a communications management module 1050. The communications management module 1050 may manage communications with stations and/or other devices as illustrated in the WLAN 100 of FIG. 1A and FIG. 1B, and in the WLAN 500 of FIG. 5A, FIG. 5B, and FIG. 5C. The communications management module 1050 may be in communication with some or all of the other components of the AP 105-b via the bus or buses 1005. Alternatively, functionality of the communications management module 1050 may be implemented as a component of the transceiver module 1030, as a computer program product, and/or as at least one controller element of the processor module 1010.

The components of the AP 105-b may be configured to implement aspects discussed above with respect FIG. 6A, FIG. 6B, FIG. 7A, and FIG. 7B, and those aspects may not be repeated here for the sake of brevity. Moreover, the components of the AP 105-b may be configured to implement aspects discussed below with respect to FIG. 12, FIG. 13, and FIG. 14 and those aspects may not be repeated here also for the sake of brevity.

Figure 11:
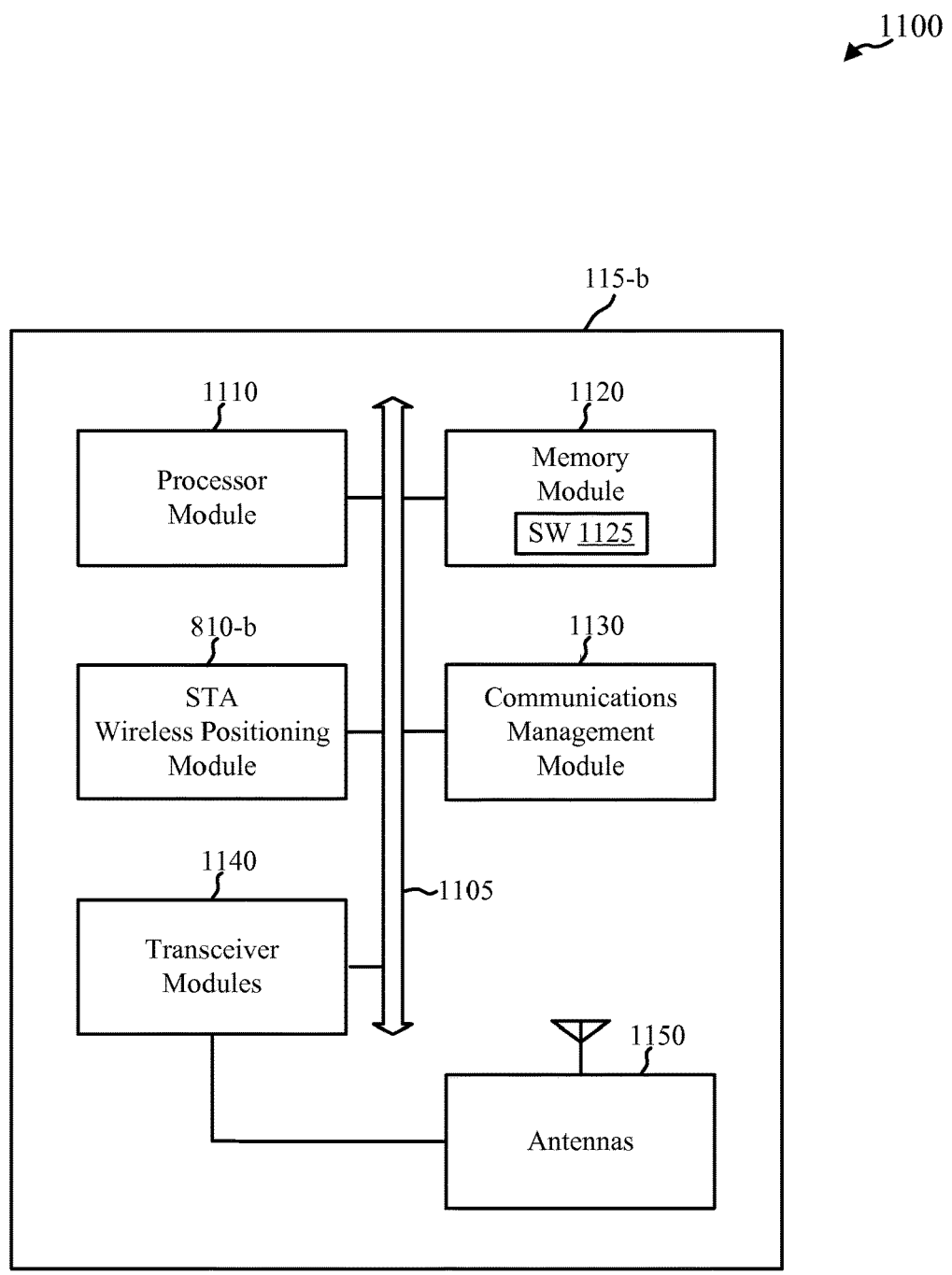
FIG. 11 shows a block diagram that illustrates an example of a station architecture according to various embodiments.

Turning to FIG. 11, a diagram 1100 is shown that illustrates a station 115-b configured for AP-assisted wireless positioning. The station 115-b may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-b may have an internal power supply (not shown), such as a small battery, to facilitate mobile operation. The station 115-b may be an example of the stations 115 of FIG. 1A, FIG. 1B, FIG. 5C, FIG. 5B, and FIG. 5C.

The station 115-b may include a processor module 1110, a memory module 1120, a transceiver module 1140, antennas 1150, and an STA wireless positioning module 810-b. The STA wireless positioning module 810-b may be an example of the STA wireless positioning modules 810 and 810-b of FIG. 8A and FIG. 8B, respectively. Each of these components may be in communication with each other, directly or indirectly, over at least one bus 1105.

The memory module 1120 may include RAM and ROM. The memory module 1120 may store computer-readable, computer-executable software (SW) code 1125 containing instructions that are configured to, when executed, cause the processor module 1110 to perform various functions described herein for AP-assisted wireless positioning. Alternatively, the software code 1125 may not be directly executable by the processor module 1110 but be configured to cause the computer (e.g., when compiled and executed) to perform functions described herein.

The processor module 1110 may include an intelligent hardware device, e.g., a CPU, a microcontroller, an ASIC, etc. The processor module 1110 may process information received through the transceiver module 1140 and/or to be sent to the transceiver module 1140 for transmission through the antennas 1150. The processor module 1110 may handle, alone or in connection with the STA wireless positioning module 810-b, various aspects for AP-assisted wireless positioning.

The transceiver module 1140 may be configured to communicate bi-directionally with APs 105 in FIG. 1A, FIG. 1B, FIG. 5A, FIG. 5B, and FIG. 5C. The transceiver module 1140 may be implemented as at least one transmitter module and at least one separate receiver module. The transceiver module 1140 may include a modem configured to modulate the packets and provide the modulated packets to the antennas 1150 for transmission, and to demodulate packets received from the antennas 1150. While the station 115-b may include a single antenna, there may be embodiments in which the station 115-b may include multiple antennas 1150.

According to the architecture of FIG. 11, the station 115-b may further include a communications management module 1130. The communications management module 1130 may manage communications with various access points. The communications management module 1130 may be a component of the station 115-b in communication with some or all of the other components of the station 115-b over the at least one bus 1105. Alternatively, functionality of the communications management module 1130 may be implemented as a component of the transceiver module 1140, as a computer program product, and/or as at least one controller element of the processor module 1110.

The components of the station 115-b may be configured to implement aspects discussed above with respect to FIG. 8A, FIG. 8B, and FIG. 9, and those aspects may not be repeated here for the sake of brevity. Moreover, the components of the station 115-b may be configured to implement aspects discussed below with respect to FIG. 15, and those aspects may not be repeated here also for the sake of brevity.

Figure 12:
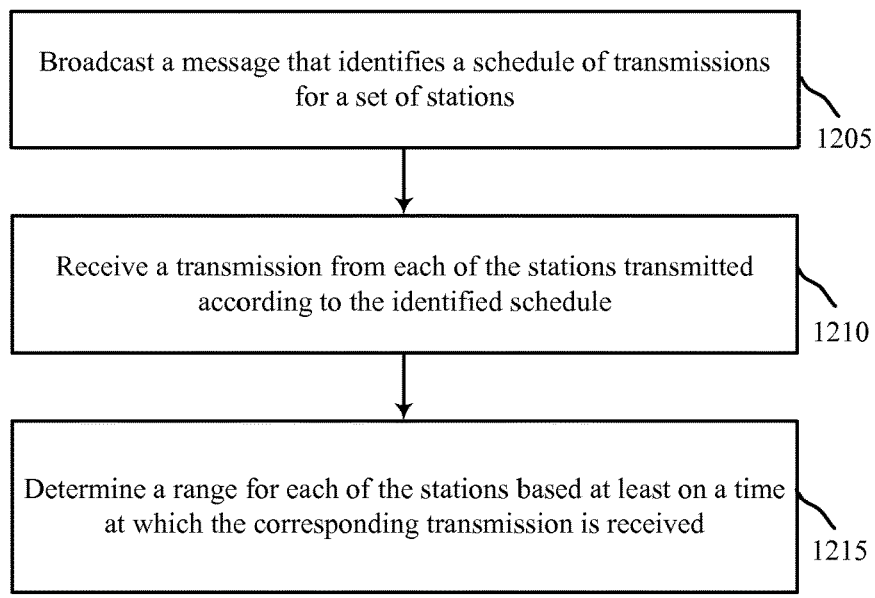
FIG. 12 is a flowchart of an example of a method for AP-assisted wireless positioning according to various embodiments.

Turning next to FIG. 12, a flow diagram of a method 1200 for AP-assisted wireless positioning is provided in accordance with various embodiments. The method 1200 may be implemented using, for example, the APs 105 of FIG. 1A, FIG. 1B, FIG. 5A, FIG. 5B, FIG. 5C, and FIG. 10; the devices 600 and 600-a of FIG. 6A and FIG. 6B, respectively; the AP wireless positioning modules 610, 610-a, and 610-b of FIG. 6A, FIG. 6B, and FIG. 10; and/or the WLAN 100 of FIG. 1A and FIG. 1B and the WLAN 500 of FIG. 5A, FIG. 5B, and FIG. 5C.

At block 1205, a message (e.g., SCC IE 205) may be broadcast that identifies a schedule of transmissions (e.g., ACK frames 210) for a set of stations (e.g., stations 115). At block 1210, a transmission from each of the stations is received, where the transmissions were transmitted according to the identified schedule. At block 1215, a range (e.g., distance, delay) may be determined for each of the stations based at least on a time at which the corresponding transmission is received.

In some embodiments of the method 1200, the schedule of transmission is a schedule of uplink transmissions and the received transmissions are uplink transmissions. In some cases, the schedule of transmission is a schedule of downlink transmissions and the received transmissions are downlink transmissions. In some embodiments of the method 1200, the schedule identifies a distinct backoff (e.g., SIFS_n) for the transmission from each of the stations. The distinct backoff for each of the stations may be based at least on a respective station identifier (e.g., AID_n). The broadcast message may identify each of the stations in the set (e.g., SCC IE, AID_First, AID_Last).

In some embodiments of the method 1200, a frame spacing parameter (e.g., SIFSx) and a delay parameter (e.g., max(p1, ..., pN)) are identified (e.g., SCC parameters IE) to be used for determining the schedule. One or both of the frame spacing and delay parameters (e.g., SCC parameters IE) may be adapted based at least on the ranges determined for the stations. The frame spacing parameter may be identified by first exchanging packets with each of the stations to determine multiple frame spacing parameters (e.g., SIFS) for the stations and then identify the largest of those frame spacing parameters to be used for determining the schedule (e.g., to be used as SIFSx).

In some embodiments of the method 1200, the stations in the set are identified from stations associated with an access point (e.g., AP 105). The stations in the set may be identified based at least on a ranging accuracy sought by the access point. Clock drifts for multiple stations may be estimated and the stations in the set may be identified based at least on the estimated clock drifts.

In some embodiments of the method 1200, each station in the set is assigned an identifier (e.g., AID_n) to define an order of transmissions in the schedule. The order of transmissions in the schedule may be defined according to a clock drift or a ranging accuracy sought for each respective station.

In some embodiments of the method 1200, a duration of the scheduled transmissions is determined and those stations outside the set are directed to avoid transmissions during the duration of the scheduled transmissions.

Figure 13:
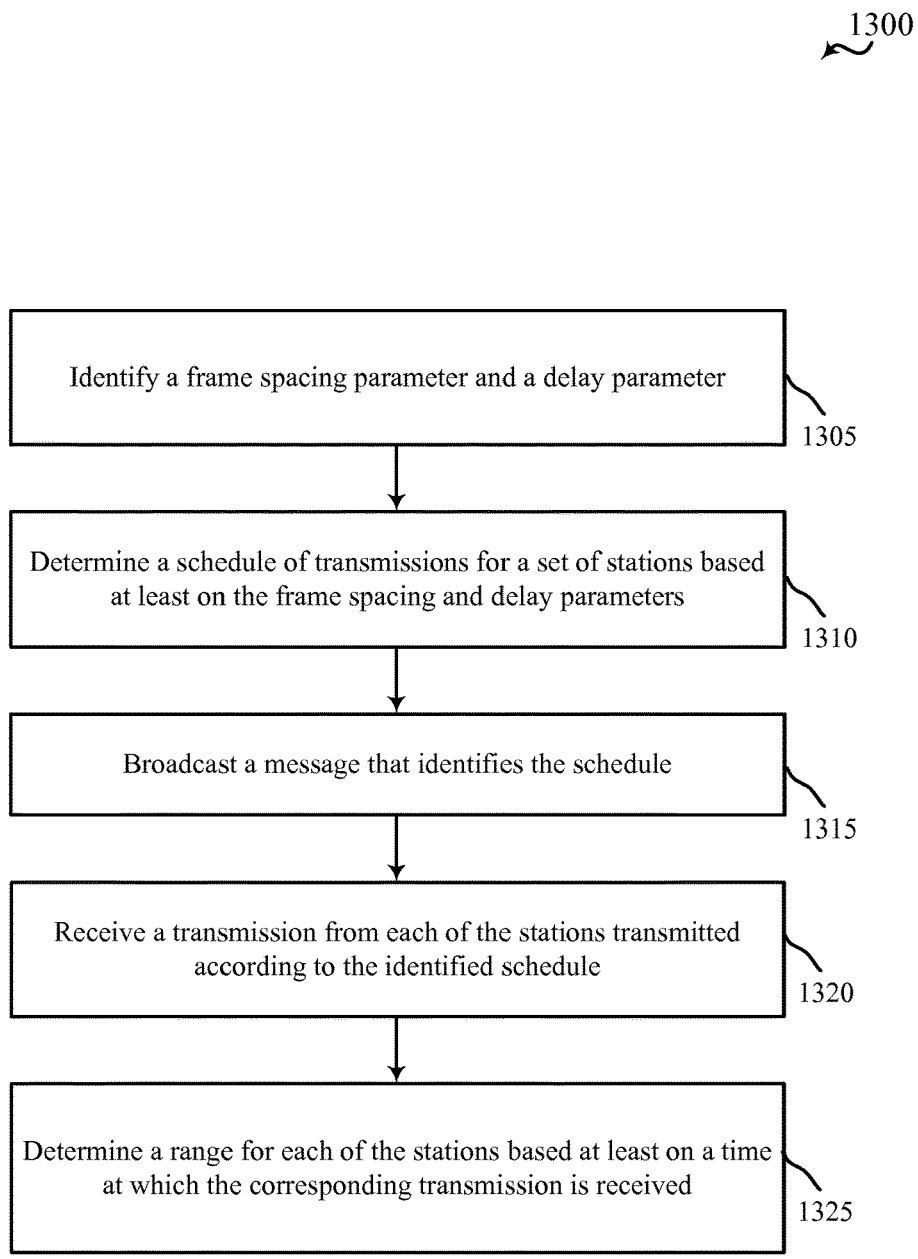
FIG. 13 is a flowchart of an example of another method for AP-assisted wireless positioning according to various embodiments.

Turning next to FIG. 13, a flow diagram of a method 1300 for AP-assisted wireless positioning is provided in accordance with various embodiments. The method 1300, like the method 1200 above, may be implemented using, for example, the APs 105 of FIG. 1A, FIG. 1B, FIG. 5A, FIG. 5B, FIG. 5C, and FIG. 10; the devices 600 and 600-a of FIG. 6A and FIG. 6B, respectively; the AP wireless positioning modules 610, 610-a, and 610-b of FIG. 6A, FIG. 6B, and FIG. 10; and/or the WLAN 100 of FIG. 1A and FIG. 1B and the WLAN 500 of FIG. 5A, FIG. 5B, and FIG. 5C.

At block 1305, a frame spacing parameter (e.g., SIFSx) and a delay parameter (e.g., max(p1, ..., pN)) may be identified. At block 1310, a schedule of transmissions (e.g., ACK frames 210) may be determined for a set of stations (e.g., stations 115) based at least on the frame spacing and delay parameters. At block 1315, a message (e.g., the SCC IE 205) may be broadcast that identifies the schedule. At block 1320, a transmission from each of the stations is received, where the transmissions were transmitted according to the identified schedule. At block 1325, a range (e.g., distance, delay) may be determined for each of the stations based at least on a time at which the corresponding transmission is received.

Figure 14:
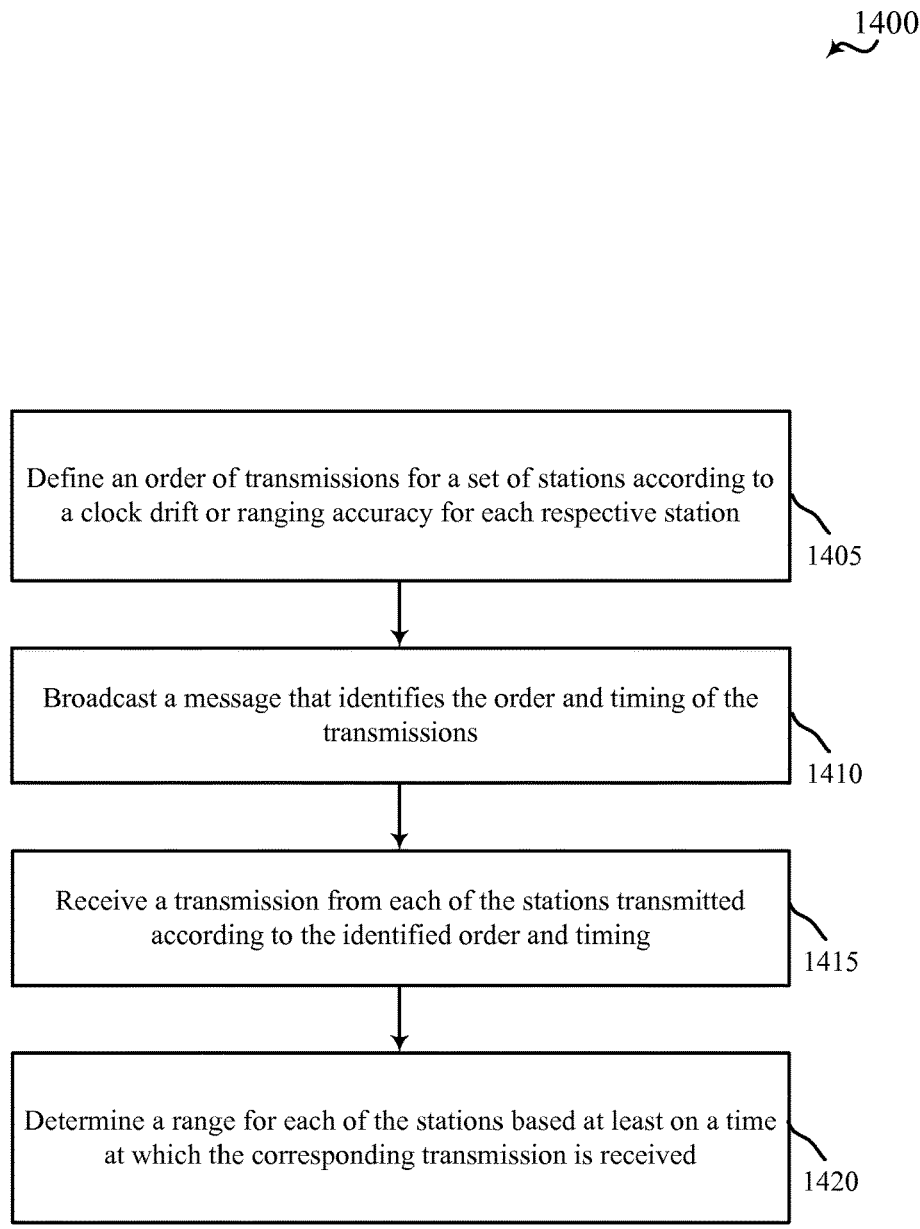
FIG. 14 is a flowchart of an example of yet another method for AP-assisted wireless positioning according to various embodiments.

Turning next to FIG. 14, a flow diagram of a method 1400 for AP-assisted wireless positioning is provided in accordance with various embodiments. The method 1400, like the methods 1200 and 1300 above, may be implemented using, for example, the APs 105 of FIG. 1A, FIG. 1B, FIG. 5A, FIG. 5B, FIG. 5C, and FIG. 10; the devices 600 and 600-a of FIG. 6A and FIG. 6B, respectively; the AP wireless positioning modules 610, 610-a, and 610-b of FIG. 6A, FIG. 6B, and FIG. 10; and/or the WLAN 100 of FIG. 1A and FIG. 1B and the WLAN 500 of FIG. 5A, FIG. 5B, and FIG. 5C.

At block 1405, an order of transmissions (e.g., ACK frames 210) may be defined for a set of stations (e.g., stations 115) according to a clock drift or ranging accuracy for each respective station. At block 1410, a message (e.g., the SCC IE 205) may be broadcast that identifies the order and timing of the transmissions. At block 1415, a transmission from each of the stations is received, where the transmissions were transmitted according to the identified schedule. At block 1420, a range (e.g., distance, delay) may be determined for each of the stations based at least on a time at which the corresponding transmission is received.

Figure 15:
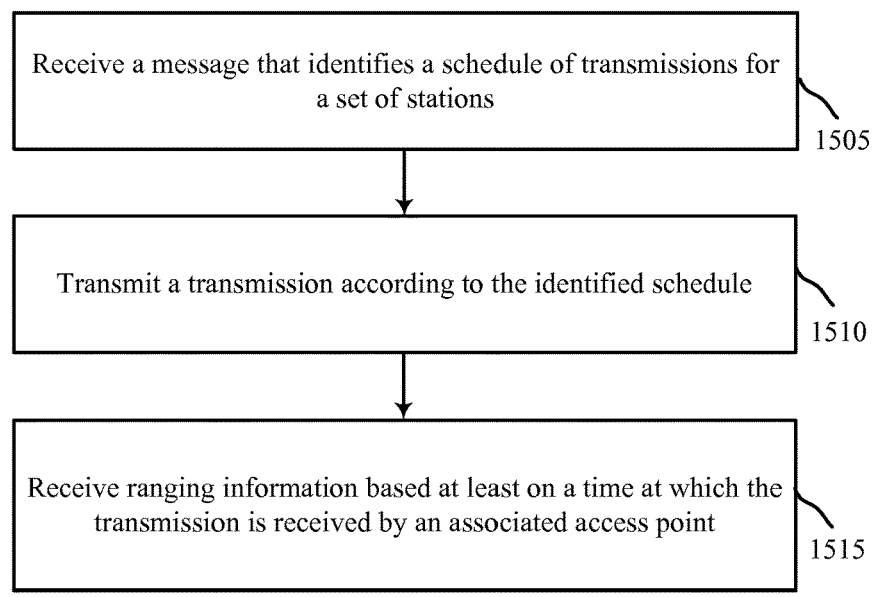
FIG. 15 is a flowchart of an example of yet another method for AP-assisted wireless positioning according to various embodiments.

Turning next to FIG. 15, a flow diagram of a method 1500 for AP-assisted wireless positioning is provided in accordance with various embodiments. The method 1500 may be implemented using, for example, the stations 115 of FIG. 1A, FIG. 1B, FIG. 5A, FIG. 5B, FIG. 5C, and FIG. 11; the devices 800 and 800-a of FIG. 8A and FIG. 8B, respectively; the AP wireless positioning modules 810, 810-a, and 810-b of FIG. 8A, FIG. 8B, and FIG. 11; and/or the WLAN 100 of FIG. 1A and FIG. 1B and the WLAN 500 of FIG. 5A, FIG. 5B, and FIG. 5C.

At block 1505, a broadcast message (e.g., the SCC IE 205) may be received that identifies a schedule of transmissions (e.g., ACK frames 210) for a set of stations (e.g., stations 115). At block 1510, a transmission is transmitted according to the identified schedule (i.e., when the station is to respond to the broadcast message). At block 1515, ranging information (e.g., distance, delay, RTT) may be received, where the ranging information is based at least on the time at which the transmission is received by an associated access point.

The detailed description set forth above in connection with the appended drawings describes exemplary embodiments and does not represent the only embodiments that may be implemented or that are within the scope of the claims. The term "exemplary" when used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disc ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless positioning, comprising:
    determining a set of stations associated with a basic service set;
    broadcasting, by an access point, a message including data that identifies a subset of stations from the set of stations for performing a ranging procedure and data that identifies a schedule of transmissions for the subset of stations during the ranging procedure;
    receiving a transmission from at least one station from the subset of stations transmitted according to the identified schedule; and
    determining a range for the at least one station from the subset of stations based at least on a time at which the respective transmission is received.

2. The method of claim 1, wherein the schedule identifies a distinct backoff for the transmission from the at least one station from the subset of stations.

3. The method of claim 2, wherein the distinct backoff for the at least one station from the subset of stations is based at least on a respective station identifier.

4. The method of claim 1, wherein the schedule of transmissions for the subset of stations comprises a schedule of uplink transmissions for the subset of stations.

5. The method of claim 4, wherein the transmissions from the at least one station from the subset of stations comprises an uplink transmission from the at least one station from the subset of stations.

6. The method of claim 1, wherein the schedule of transmissions for the subset of stations comprises a schedule of downlink transmissions for the subset of stations.

7. The method of claim 6, wherein the transmissions from the at least one station from the subset of stations comprises a downlink transmission from the at least one station from the subset of stations.

8. The method of claim 1, further comprising:
    identifying a frame spacing parameter and a delay parameter to be used for determining the schedule.

9. The method of claim 8, further comprising:
    adapting one or both of the frame spacing parameter and the delay parameter based at least on the range determined for the at least one station from the subset of stations.

10. The method of claim 8, wherein identifying the frame spacing parameter comprises:
    exchanging packets with the at least one station from the subset of stations to determine a plurality of frame spacing parameters for the stations; and
    identifying a largest of the plurality of frame spacing parameters to be used for determining the schedule.

11. The method of claim 1, wherein the stations in the subset of stations are identified based at least on a ranging accuracy sought by an access point.

12. The method of claim 1, further comprising:
    estimating clock drifts for the set of stations, wherein the stations in the subset of stations are identified based at least on the estimated clock drifts for the set of stations.

13. The method of claim 1, further comprising:
    assigning a station identifier to one or more stations from the subset of stations to define an order of transmissions in the schedule.

14. The method of claim 1, further comprising:
defining an order of transmissions in the schedule according to a clock drift or a ranging accuracy sought for at least one respective station in the subset of stations.

15. The method of claim 1, further comprising:
determining a duration of the scheduled transmissions; and
directing at least one station outside the subset of stations to avoid transmissions during the duration of the scheduled transmissions.

16. An apparatus for wireless positioning, comprising:
a schedule identification module implemented in a processor to determine a set of stations associated with a basic service set;
a transmitter configured to broadcast a message including data that identifies a subset of stations from the set of stations for performing a ranging procedure and data that identifies a schedule of transmissions for the subset of stations during the ranging procedure;
a receiver configured to receive a transmission from at least one station from the subset of stations transmitted according to the identified schedule; and
a determinator implemented in the processor to determine a range for the at least one station from the subset of stations based at least on a time at which the respective transmission is received.

17. The apparatus of claim 16, wherein:
the schedule identifies a distinct backoff for the transmission from the at least one station from the subset of stations; and
the distinct backoff for the at least one station from the subset of stations is based at least on a respective station identifier.

18. The apparatus of claim 16, wherein the schedule of transmissions for the subset of stations comprises a schedule of uplink transmissions for the subset of stations and the transmissions from the at least one station from the subset of stations comprises an uplink transmission.

19. The apparatus of claim 16, wherein the schedule of transmissions for the subset of stations comprises a schedule of downlink transmissions for the subset of stations and the transmissions from the at least one station from the subset of stations comprises a downlink transmission.

20. The apparatus of claim 16, wherein the determinator is further configured to:
identify a frame spacing parameter and a delay parameter to be used for determining the schedule.

21. The apparatus of claim 20, wherein the determinator is further configured to:
adapt one or both of the frame spacing parameter and the delay parameter based at least on the at least on the range determined for the at least one station from the subset of stations.

22. The apparatus of claim 20, wherein the determinator is configured to identify the frame spacing parameter by:
exchanging packets with the at least one station from the subset of stations to determine a plurality of frame spacing parameters for the stations; and
identifying a largest of the plurality of frame spacing parameters to be used for determining the schedule.

23. The apparatus of claim 16, wherein
the stations in the subset of stations are identified based at least on a ranging accuracy sought by an access point.

24. The apparatus of claim 16, wherein the determinator is further configured to:
estimate clock drifts for the set of stations, wherein the stations in the subset of stations are identified based at least on the estimated clock drifts for the set of stations.

25. The apparatus of claim 16, wherein the determinator is further configured to:
assign a station identifier to one or more stations from the subset of stations to define an order of uplink transmissions in the schedule.

26. The apparatus of claim 16, wherein the determinator is further configured to:
define an order of transmissions in the schedule according to a clock drift or a ranging accuracy sought for at least one respective station in the subset of stations.

27. A device for wireless positioning, comprising:
a processor; and
a memory in electronic communication with the processor, the memory embodying instructions executable by the processor to:
determine a set of stations associated with a basic service set;
broadcast a message including data that identifies a subset of stations from the set of stations for performing a ranging procedure and data that identifies a schedule of transmissions for the subset of stations during the ranging procedure;
receive a transmission from at least one station from the subset of stations transmitted according to the identified schedule; and
determine a range for the at least one station from the subset of stations based at least on a time at which the respective transmission is received.

28. A computer program product for wireless positioning, the computer program product comprising a non-transitory computer-readable medium storing instructions executable by a processor to:
determine a set of stations associated with a basic service set;
broadcast a message including data that identifies a subset of stations from the set of stations for performing a ranging procedure and data that identifies a schedule of transmissions for the subset of stations during the ranging procedure;
receive a transmission from at least one station from the subset of stations transmitted according to the identified schedule; and
determine a range for at the least one station from the subset of stations based at least on a time at which the respective transmission is received.

29. The device of claim 27, wherein the instructions are executable to cause the processor to:
identify a frame spacing parameter and a delay parameter to be used for determining the schedule; and
adapt one or both of the frame spacing parameter and the delay parameter based at least on the range determined for the at least one station from the subset of stations.

30. The device of claim 27, wherein the instructions are executable to cause the processor to:
estimate clock drifts for the set of stations, wherein the stations in the subset of stations are identified based at least on the estimated clock drifts for the set of stations.

* * * * *